(12) United States Patent
Sirdevan et al.

(10) Patent No.: US 8,296,461 B2
(45) Date of Patent: Oct. 23, 2012

(54) DATA TRANSFORMATION AND EXCHANGE

(75) Inventors: Scott Michael Sirdevan, Green Cove Springs, FL (US); John Darwin Grow, Palm Coast, FL (US); Paul Allan Sisco, Middleburg, FL (US); Paul Robert Beck, Jr., Jacksonville, FL (US); Matthew Aloysius Calderaro, Jacksonville, FL (US); Charles Barber, Jacksonville, FL (US); David Slater, Jacksonville, FL (US); Jason Workman, Jacksonville, FL (US); Ronnie E. King, II, Jacksonville, FL (US); Terry Lee Sirdevan, Orange Park, FL (US); William Carlson, Jacksonville, FL (US); Zane Schott, St. Augustine, FL (US)

(73) Assignee: Object Innovation Inc., Jacksonville, FL (US)

( * ) Notice: Subject to any disclaimer, the term of this patent is extended or adjusted under 35 U.S.C. 154(b) by 116 days.

(21) Appl. No.: 12/187,097

(22) Filed: Aug. 6, 2008

(65) Prior Publication Data
US 2009/0119416 A1 May 7, 2009

Related U.S. Application Data

(60) Provisional application No. 60/954,442, filed on Aug. 7, 2007.

(51) Int. Cl.
G06F 15/16 (2006.01)
(52) U.S. Cl. ...................... 709/246; 707/999.2; 370/389
(58) Field of Classification Search .................... 709/246
See application file for complete search history.

(56) References Cited

U.S. PATENT DOCUMENTS

| | | | |
|---|---|---|---|
| 5,784,544 A * | 7/1998 | Stevens | 358/1.13 |
| 6,085,203 A * | 7/2000 | Ahlers et al. | 715/201 |
| 6,189,045 B1 * | 2/2001 | O'Shea et al. | 709/246 |
| 6,240,186 B1 | 5/2001 | Hyde et al. | |
| 6,516,353 B1 | 2/2003 | Richards | |
| 6,912,522 B2 | 6/2005 | Edgar | |
| 7,325,027 B2 | 1/2008 | Grow et al. | |
| 7,328,005 B2 * | 2/2008 | Aasman et al. | 455/414.4 |
| 2001/0056504 A1 * | 12/2001 | Kuznetsov | 709/310 |
| 2002/0065929 A1 * | 5/2002 | Kamentsky et al. | 709/231 |
| 2002/0089994 A1 * | 7/2002 | Leach et al. | 370/412 |
| 2002/0167899 A1 * | 11/2002 | Thompson et al. | 370/222 |
| 2003/0014557 A1 * | 1/2003 | Berger et al. | 709/318 |
| 2003/0037100 A1 | 2/2003 | Olejar et al. | |
| 2003/0061385 A1 | 3/2003 | Gonze | |
| 2003/0081547 A1 * | 5/2003 | Ho | 370/229 |
| 2004/0012628 A1 * | 1/2004 | Kropf et al. | 345/744 |
| 2004/0078787 A1 * | 4/2004 | Borek et al. | 717/136 |
| 2005/0036497 A1 * | 2/2005 | Kawakami | 370/395.21 |
| 2005/0138667 A1 * | 6/2005 | Delpuch | 725/105 |
| 2005/0149536 A1 * | 7/2005 | Wildes et al. | 707/100 |

(Continued)

Primary Examiner — Firmin Backer
Assistant Examiner — Hamza Algibhah
(74) Attorney, Agent, or Firm — Foley and Lardner LLP

(57) ABSTRACT

A data transformation and exchange server receives an input data stream from one or more application servers and/or computing devices. The data stream includes a plurality of input records and each input record can be in a different input protocol and/or character encoding. The transformation and exchange server determines each input record in the input data stream based on one or more boundary points and determines a template from a plurality of templates based on the input record. The transformation and exchange server transforms the input record into an output record based on the template and communicates the output record via an output data stream.

24 Claims, 17 Drawing Sheets

U.S. PATENT DOCUMENTS

| | | | |
|---|---|---|---|
| 2006/0007887 A1* | 1/2006 | Kwon et al. | 370/329 |
| 2006/0031584 A1* | 2/2006 | McKinley et al. | 709/246 |
| 2006/0156219 A1* | 7/2006 | Haot et al. | 715/500.1 |
| 2006/0171338 A1* | 8/2006 | Lim | 370/278 |
| 2006/0287912 A1* | 12/2006 | Raghuvamshi | 705/14 |
| 2007/0003134 A1* | 1/2007 | Song et al. | 382/154 |
| 2007/0130361 A1* | 6/2007 | Li | 709/231 |
| 2007/0139233 A1* | 6/2007 | Matsuda | 341/50 |
| 2007/0147386 A1* | 6/2007 | Choi et al. | 370/395.1 |
| 2007/0150520 A1* | 6/2007 | Bennett et al. | 707/200 |
| 2007/0174852 A1* | 7/2007 | Smirnov et al. | 719/328 |
| 2007/0242890 A1* | 10/2007 | Wen et al. | 382/233 |
| 2008/0002790 A1* | 1/2008 | Itoh | 375/317 |
| 2008/0031434 A1* | 2/2008 | Martino | 379/93.17 |
| 2008/0126558 A1* | 5/2008 | Tinsman et al. | 709/232 |
| 2008/0147436 A1* | 6/2008 | Ohlsson | 705/2 |
| 2008/0163317 A1* | 7/2008 | Mills | 725/109 |
| 2008/0186975 A1* | 8/2008 | Becker | 370/395.4 |
| 2008/0198844 A1* | 8/2008 | Cohen et al. | 370/389 |
| 2008/0235260 A1* | 9/2008 | Han et al. | 707/102 |
| 2009/0063189 A1* | 3/2009 | Hupke et al. | 705/3 |
| 2009/0300450 A1* | 12/2009 | Tzannes | 714/748 |
| 2009/0327398 A1* | 12/2009 | Campbell et al. | 709/202 |

* cited by examiner

DATA TRANSFORMATION AND EXCHANGE

CROSS REFERENCE TO RELATED APPLICATIONS

This application claims priority to U.S. Provisional Patent Application No. 60/954,442 filed on Aug. 7, 2007, entitled "BridgeGate Improvement Application," which is incorporated by reference in its entirety. This application is related to U.S. patent application Ser. No. 10/457,832 filed on Jun. 9, 2003, now U.S. Pat. No. 7,325,027, which is incorporated by reference in its entirety.

BACKGROUND OF THE INVENTION

The present invention is related to the fields of data transformation and exchange, including data interchange systems and data connectivity, and integration and related software and methods.

Communication and connectivity between disparate entities has been a significant technical and financial challenge for the past thirty years. Over the years, electronic data interchange ("EDI") formats and standards have emerged to communicate between data interchange systems of these disparate entities or sources in an effort to bring method and order to the process. For example, disparate entities often exchange documents that conform to EDI standards in efforts to streamline communication between the entities. Entities often buy software that provides the functionality needed to translate data to an EDI format for further processing at another computer system. Even with the development of EDI protocols, however, each implementation of these systems still often requires individual and customized work to adapt to each "node" in a communications network so that the entities can communicate effectively. This custom approach, however, is expensive, time-consuming and static (requiring modification as a result of each and every change).

Recently, various enhanced protocols and standards, such as XML and newer EDI standards, were developed to accommodate today's explosive e-business environment. Even so, there are still multiple standards, and there are nuances within almost every business entity and application so that effective data interchange between entities, sources, or applications still remains extremely expensive and time-consuming to implement.

For example, an administrator of at least one of these entities, sources, or application often manually performs various tasks required to prepare a data set or file for transfer and processing on another computer system which is often remote. Likewise, an administrator at the receiving computer system often performs many tasks to process the received data. The administrator, for example, can manipulate, copy, append, create, delete, or perform various other functions on files depending on the condition or requirements of the data or documents to be transferred or received. Also, the administrator can encrypt, compress, or translate the data to another format. Further, the administrator often maps data from one format to another and performs tasks to complete the transfer or receipt of a data set or file to and from another computer system. These administrators also often create scripts or instruction sets to assist them in performing various tasks. These functions by the administrator can be time consuming and expensive as complexities related to a plurality of different entities interfacing with one company have different data formats, standards, or protocols. These complexities often require teams of analysts at a customer site, for example, and a team of analysts at a supplier site or distributor site to try to address the data connectivity issues between the entities.

More recently, software has emerged in attempts to address some of these problems. Many of the software companies are focusing only on the very expensive, top-tier implementations. They build software modules that "plug-in" between specific, popular commercial software applications, and have additional tools to address disparate communication environments. Although these companies can be somewhat successful in facilitating working environments, they can easily cost millions of dollars to implement, and take several months (to over a year) to complete. They require the services of trained systems integrators to manage and facilitate their installation.

For example, many conventional approaches for addressing disparate data interchange generally set a proposed solution on top of some existing data "standard" such as a particular version of EDI such as X12, some version of XML such as ebXML, or some other proprietary data format. A "standard" solution is often problematic in that invariably entities wanting to connect electronically to another company often have to adopt that other entity's data "standard" whether it is convenient or not. This problem is like getting 12 people into a room, all of whom speak different languages, and trying to decide how to communicate with one another.

SUMMARY OF THE INVENTION

One aspect of the invention relates to a method for data transformation and exchange. The method includes determining an input record based on one or more boundary points in an input data stream and determining a template from a plurality of templates based on the input record. The method further includes transforming the input record to an output record based on the template and communicating the output record via an output data stream.

Another aspect of the invention relates to a computer readable medium embodying computer program product for performing data processing, the computer program product, when executed by a computer, causing the computer to perform a step of determining an input record based on one or more boundary points in an input data stream. The computer program product further causes the computer to perform the steps of determining a template from a plurality of templates based on the input record and transforming the input record to an output record based on the template. The computer program product further causes the computer to perform the step of communicating the output record via an output data stream.

According to another aspect of the invention, there is provided a data transformation and exchange system. The system includes a data boundary module, a template selection module, and a transformation module. The data boundary module determines an input record based on one or more boundary points in an input data stream. The template selection module determines a template from a plurality of templates based on the input record. The transformation module transforms the input record to an output record based on the template and communicating the output record via an output data stream.

In other examples, any of the aspects above can include one or more of the following features. One or more boundary points are designated in the input data stream based on data type information, a data validation rule, a data inbound template, and/or a data outbound template.

In some examples, the input data stream is received. The output data stream is communicated in or substantially in real-time as the input data stream is received.

In other examples, the output data stream is communicated based on a predetermined schedule. A communication failure notification associated with the output data stream is received. The output data stream is communicated based on quality of service information and the communication failure notification. The output data stream is communicated based on dynamically generated information associated with the output data stream.

In some examples, one or more data validation rules are determined based on the input record and one or more data validation templates. Data type information is determined based on the input record and one or more data type templates.

In other examples, the input record is transformed to the output record further based on the one or more data validation rules, the data type information, and/or the template. The one or more data validation rules and the data type information are determined independently.

In some examples, at least one data field in the input record is iterated through based on the template. Data is selected from the at least one data field in the input record based on the template. The data is stored in a searchable format based on the template.

In other examples, at least one data field in the input record and/or the output record is selected based on a business activity monitor rule. The selected one or more data fields is compared to at least one threshold value. A notification communication is transmitted based on the comparison of the selected one or more data fields, the notification communication generated based on the comparison.

In some examples, an accessible log of actions applied to the input record and/or output record is generated. An in-process report of the actions applied to the input record and/or output record is provided.

In other examples, data from selected fields of one or more input records associated with a plurality of transactions is aggregated to obtain an aggregated value. The aggregated value is compared to a threshold value. A notification communication is transmitted based on the comparison of the aggregated value to the threshold value, the notification communication generated based on the comparison.

In some examples, data from selected fields of one or more input records associated with a plurality of transactions is aggregated to obtain an aggregated value. The aggregated value is displayed on a computing device.

In other examples, a first character encoding for decoding data associated with the field is determined for each of a plurality of fields within the input record. A second character encoding for decoding data associated with a second field within the input record is determined.

In some examples, the input record utilizes a first protocol and the output record utilizes a second protocol.

In other examples, the input record and the output record utilize a same protocol. The input record includes a first set of data fields, the output record includes a second set of data fields, and the first set of data fields is different from the second set of data fields.

In some examples, the template includes a plurality of references to a server and further includes automatically modifying the plurality of references to the server via a single configuration modification.

In other examples, a user interface is provided to modify one or more templates from the plurality of templates. The one or more templates from the plurality of templates is modified based on information received via the user interface and associated with a protocol.

In some examples, the system further includes a data validation module and/or a data type module. The data validation module determines one or more data validation rules based on the input record and one or more data validation templates. The data type module determines data type information based on the input record and one or more data type templates.

In other examples, the system further includes a storage analysis module and a storage module. The storage analysis module iterates through at least one data field in the input record based on the template and selecting data from the at least one data field in the input record based on the template. The storage module stores the data in a searchable format based on the template.

In some examples, the system further includes a business activity monitor module. The business activity monitor module selects at least one data field in the input record and/or the output record based on a business activity monitor rule. The business activity monitor module compares the selected one or more data fields to at least one threshold value and transmitting a notification communication based on the comparison of the selected one or more data fields. The notification communication is generated based on the comparison.

In other examples, the system further includes a compare module and/or a notification module. The compare module aggregates data from selected fields of one or more input records associated with a plurality of transactions to obtain an aggregated value and comparing the aggregated value to a threshold value. The notification module transmits a notification communication based on the comparison of the aggregated value to the threshold value, the notification communication generated based on the comparison.

In some examples, the compare module aggregates data from selected fields of one or more input records associated with a plurality of transactions to obtain an aggregated value. The notification module displays the aggregated value on a computing device.

Other features, aspects, examples, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

Exemplary embodiments will hereafter be described with reference to the accompanying drawings, wherein like numerals depict like elements, and in which.

DETAILED DESCRIPTION OF THE PREFERRED EMBODIMENTS

The present invention now will be described more fully hereinafter with reference to the accompanying drawings in which illustrated embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout, and prime, double, or triple prime notation, if used, refers to like elements in alternative embodiments.

Figure 1:
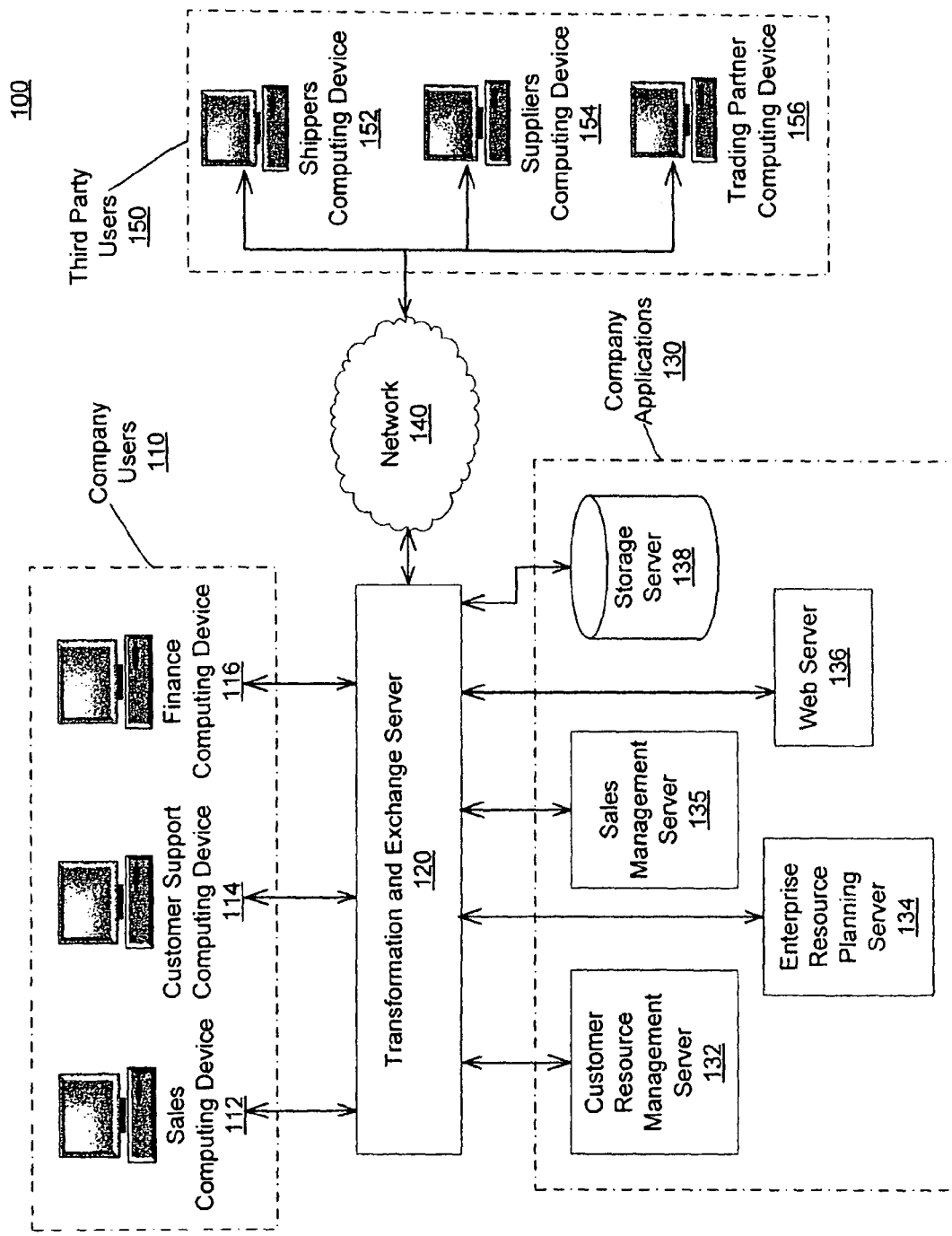
FIG. 1 illustrates an exemplary transformation and exchange system.

FIG. 1 illustrates an exemplary transformation and exchange system 100. The transformation and exchange system 100 can provide a stratified universal mapping and deployment technology that automates the electronic data interchange among multiple distinct entities using virtually any data format, any connectivity protocol, and/or any other delivery mechanism. The transformation and exchange system 100 includes company users 110, a transformation and exchange server 120, company applications 130, a network 140, and third party users 150. The company users 110 include a sales computing device 112, a customer support computing device 114, and a finance computing device 116. The company applications 130 include a customer resource management server 132, an enterprise resource planning server 134, a sales management server 135, a web server 136, and a storage server 138. The third party users 150 include a shippers computing device 152, a suppliers computing device 154, and a trade partner computing device 156.

The transformation and exchange server 120 receives an input data stream from one or more application servers (e.g., the company application servers 130, the third party application servers 150, etc.) and/or computing devices (e.g., company user computer devices 110, third party computer devices 150, etc.). The data stream includes a plurality of input records, whereby each input record can be in a different input protocol and/or character encoding. The transformation and exchange server 120 determines each input record in the input data stream based on one or more boundary points. Each boundary point can be associated with the beginning and/or end of a protocol (e.g., <html> . . . </html>, <? xml version="1.0">, etc.) and/or character encoding (e.g., <?xml version="1.0" encoding="ISO-8859-1"?>, <meta http-equiv="Content-Type" content="text/html; charset=US-ASCII">, etc.).

The transformation and exchange server 120 determines a template from a plurality of templates based on the input record. Each template is associated with one or more protocols (e.g., extended markup language (XML), electronic data interchange (EDI), etc.), character encodings (e.g., English, Japanese, etc.), and/or other business associated information (e.g., a trading partner, a business application rule, a financial rule, a user rule, a pharmacy business template, a retailer template, etc.).

The transformation and exchange server 120 transforms the input record into an output record based on the template. The transformation of the input record into the output record can include converting from an input protocol to an output protocol (e.g., cXML, EDI ASC X12, simple mail transfer protocol (SMTP), transmission control protocol (TCP), Universal Description, Discovery and Integration (UDDI), web services description language (WSDL), SOAP, EDIFACT, comma delimited file data, and/or other formats including XML, HIPPA, etc.), converting from an input character encoding to an output character encoding (e.g., English to Chinese, Japanese to Arabic, etc.), modifying content of the input record for the output record (e.g., remove end of line characters, replace quotes with special characters, numeric transformations, etc.), and/or modifying parameters of the input record for the output record (e.g., modify error correction protocol, modify the encryption key information, etc.). An advantage of the transformation of each input record separately is that each input record can utilize a different template which enables communication with a larger and more diverse set of parties. Another advantage of the transformation of each input record separately is that the transformation of different types of input records can occur in or substantially in real-time as the input data stream is received because of the allocation of different templates based on the input record.

The transformation and exchange server 120 communicates the output record via an output data stream. The output data stream is transmitted to one or more application servers (e.g., company application servers, third party application servers, etc.) and/or computing devices (e.g., company user computer devices, third party computer devices, etc.). The transmission of the output data stream to a plurality of application servers and/or computing devices can occur simultaneously through a multicast network mechanism (e.g., IP multicast, mobile just-in-time multicasting, etc.).

Each company user 110, e.g., the sales computing device 112, communicates with the transformation and exchange server 120 to request and/or transmit data. Each third party user 150, e.g., the shippers computing device 152, communicates with the transformation and exchange server 120 via the network 140 to request and/or transmit data.

In other examples, the output data stream is communicated based on a predetermined schedule (e.g., every day at 1:00 am, when the output data stream has more than fifty records, when the output data stream is larger than ten megabytes, etc.). In some examples, the transformation and exchange server 120 receives the input data stream. The output data stream can be, for example, communicated by the transformation and exchange server 120 in or substantially in real-time as the input data stream is received.

In some examples, the output data stream is communicated based on dynamically generated information associated with the output data stream. The transformation and exchange server 120 can, for example, dynamically generate information regarding relative size of the input data stream to the output data stream, network availability, processor availability, and/or any other type of dynamic information.

For example, the finance computing device 116 transmits a request for sales data to the transformation and exchange server 120. The sales data request includes content and parameters in HR-XML protocol (in this example, application/xml, <query>All sales data for salesman John Smith employee number=12345 for FY2007</query>). The transformation and exchange server 120 transforms the request from an input protocol associated with the finance computing device 116 (in this example, XML protocol) to an output protocol associated with the sales management server 135 (in this example, EDI protocol). The transformation exchange server 120 communicates the transformed request in the output protocol to the sales management server 135 (in this example, application/821, QY=All sales data for salesman John Smith employee number 12345 for FY2007).

As a further example, the sales management server 135 communicates the requested sales data to transformation and exchange server 120 as an input data stream (in this example, application/821, AN=453232.23). The input data stream is in an input protocol associated with the sales management server 135 (in this example, EDI protocol). The transformation and exchange server 120 transforms the requested sales data received from the sales management server 135 from the input protocol to an output protocol (in this example, application/xml, <answer>453232.23</answer>).

As another example, the finance computing device 116 transmits a request for sales data to the transformation and exchange server 120. The sales data request includes content and parameters in HR-XML protocol (in this example, application/xml, <query>All sales data for salesman John Smith employee number=12345 for FY2007</query>). The transformation and exchange server 120 transforms the request from an input protocol associated with the finance computing device 116 (in this example, XML protocol) to an output protocol associated with the sales management server 135 (in this example, EDI protocol). The transformation and exchange server 120 communicates the transformed request in the output protocol to the sales management server 135 (in this example, application/821, FY=2007, EmployeeID=12345, Query=A234). In other words, the transformation and exchange server 120 can modify the protocols and/or the content within the data based on the template.

Although FIG. 1 illustrates three computing devices for the company users 110 and three computing devices for the third party users 150, the transformation and exchange system 100 can include any number of computing devices for the company users 110 and/or the computing devices for the third party users 150. Although FIG. 1 illustrates five servers for the company applications 130, the transformation and exchange system 100 can include any number of servers for the company applications 130.

Figure 2A:
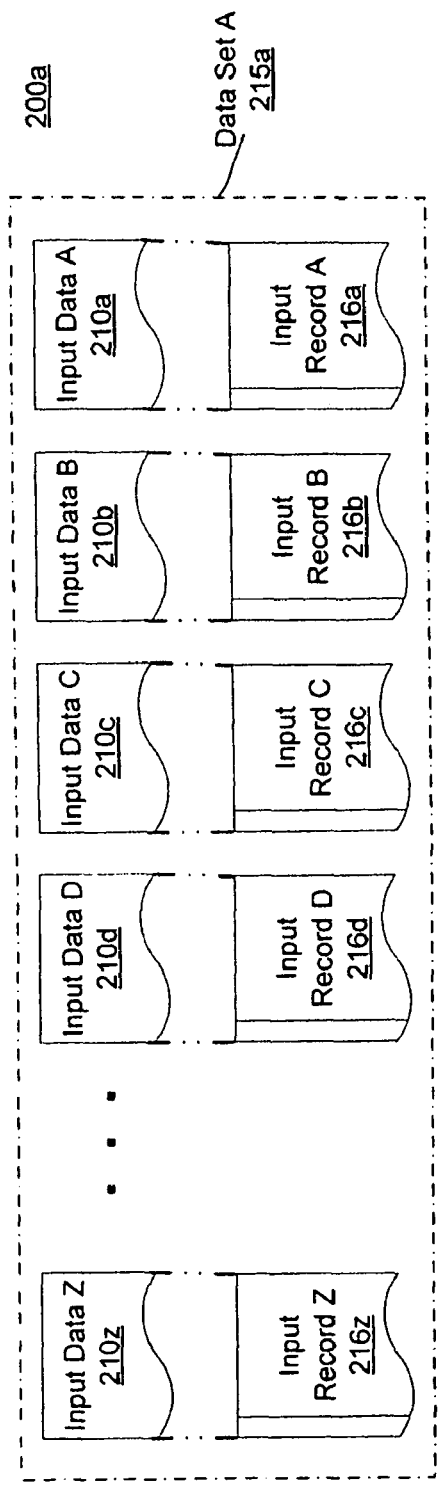
FIGS. 2A and 2B illustrate exemplary data sets.

FIG. 2A illustrates an exemplary Data Set A 215a. The Data Set A 215a includes a plurality of input data A 210a, B 210b, C 210c, D 210d through Z 210z (generally 210). Each input data 210 includes an input record 216, i.e., input data A 210a includes input record A 216a. In this illustration, each input data 210 includes and an input record A 216a, B 216b, C 216c, D 216d through Z 216z, respectfully (generally 216).

Figure 2B:
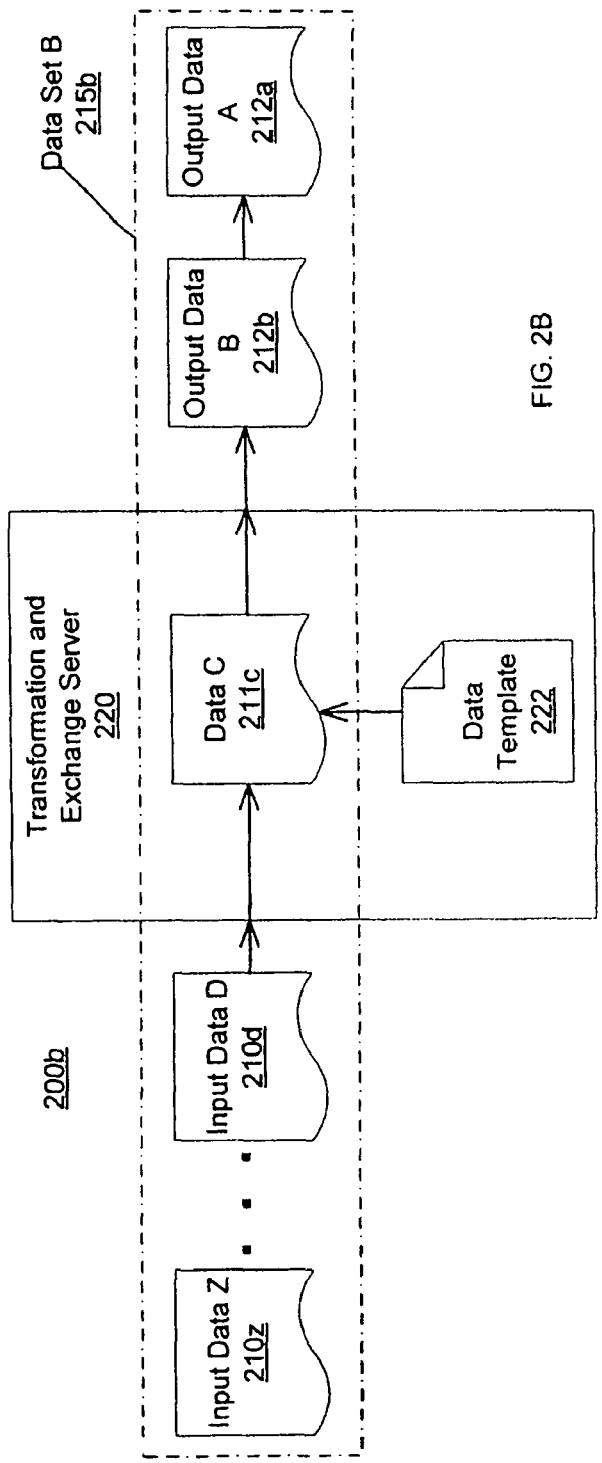

FIG. 2B illustrates an exemplary data set B 215b in a transformation process by a transformation and exchange server 220. The data set B 215b includes an output data A 212a, an output data B 212b, a data C 211c, an input data D 210d through input data Z 210z. The transformation and exchange server 220 transforms the input data, e.g., the input data B 210b, into output data, e.g., the output data B 212B. The transformation and exchange server 220 utilizes a data template 222 to transform the input data to output data. The transformation and exchange server 220 transforms the input data based on boundary points to the output data.

In some examples, the boundary points are associated with the input data and/or input records. The boundary point can be, for example, a delineator (e.g., end of line, end of transmission, etc.), a protocol field (e.g., <html>...</html>, etc.), any other type of static information (e.g., pre-defined identifiers, pre-defined record length, etc.), and/or any other type of dynamically identified information (e.g., record length based on header information, data order number, end boundary point from previous record, etc.).

For example, input record A 216a starts with <html> which defines the start boundary point for the record and ends with </html> which defines the end boundary point for the record. As another example, input record B 216b does not have an explicit start boundary point (e.g., no <html> in the file, etc.), but the transformation and exchange server 220 determines the start boundary point based on the end boundary point from the previous input record A 216a. In this example, the end boundary point from the previous input record A 216a is the </html> code. Based on the determination of the end of the record for the input record A 216a, the transformation and exchange server 220 determines the start boundary point of the input record B 216b.

In this example, FIG. 2A illustrates the boundary points as the beginning and end of each input data 210. In other words, each input data 210 includes a single input record 216. Although FIG. 2A illustrates the boundary points as the beginning and end of each input data 210, each input data 210 can include part, all, or a plurality of input records. For example, a single input data include five input records. As another example, a single input record is spread across four input data.

Figure 3A:
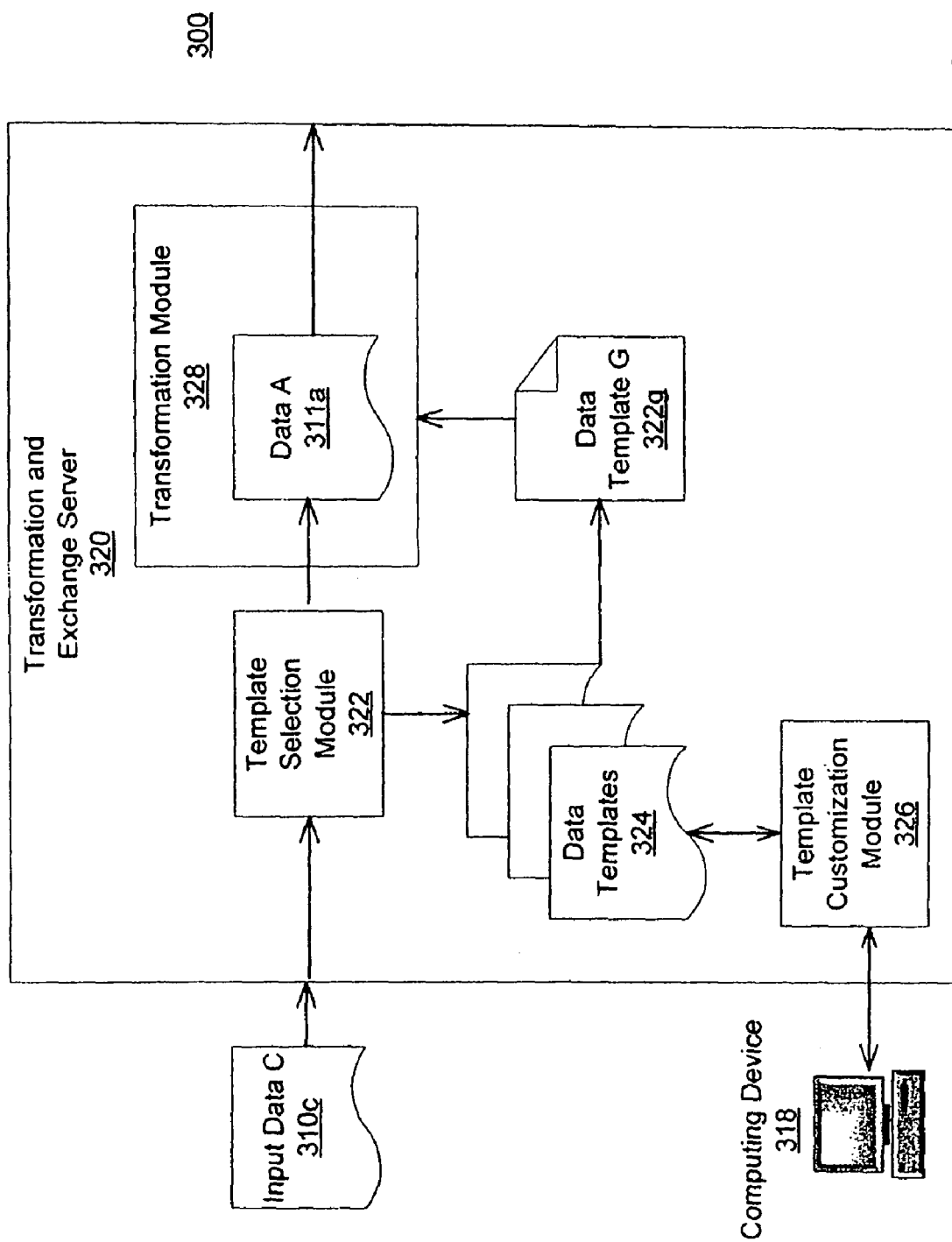
FIGS. 3A and 3B illustrate an exemplary transformation and exchange system transforming data input.
Figure 3B:
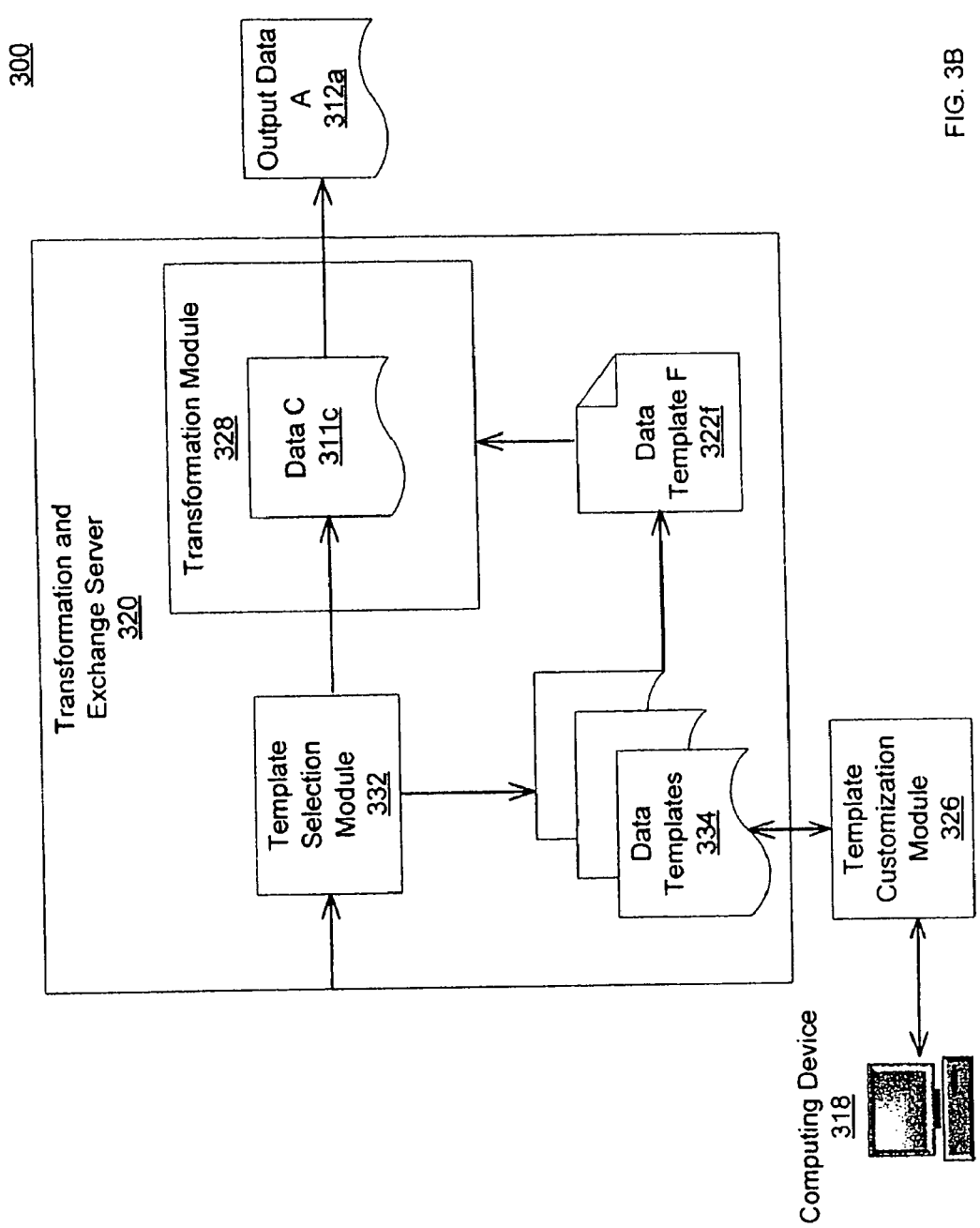

FIGS. 3A and 3B illustrate an exemplary transformation and exchange system 300 transforming data input. The transformation and exchange system 300 includes a transformation and exchange server 320, input data C 310c, and a computing device 318. The transformation and exchange server 320 includes a template selection module 322, data templates 324, a template customization module 326, and a transformation module 328. The template customization module 326 is utilized by the computing device 318 to customize and/or change preferences of the data templates 324.

The transformation and exchange server 320 receives input data C 310c and/or other input data, e.g. input data A (not shown). The template selection module 322 analyzes the input data to determine a data template from the plurality of data templates 324. The template selection module 322 analyzes input data A (not shown) and selects data template G 322g for input data A. The transformation module 328 transforms the input data A utilizing data template G 322A.

The output data A 312a from the utilization of data template G 322g is illustrated in FIG. 3B. In FIG. 3B, the input data C 310c is analyzed by the template selection module 332, and a data template F 322f is selected. The transformation module 328 transforms the input data C 311c into output data (not shown) based on the data template F 322f. As illustrated, data C 311c is the data during transformation from the input data C 310c to the output data.

In other examples, the template customization module 326 allows customization of templates using an intuitive graphical user interface (GUI). For example, the computing device 318 utilizes a web browser to view and interact with a graphical user interface that allows the user to modify (e.g., edit, add, delete, etc.) the templates.

Figure 4:
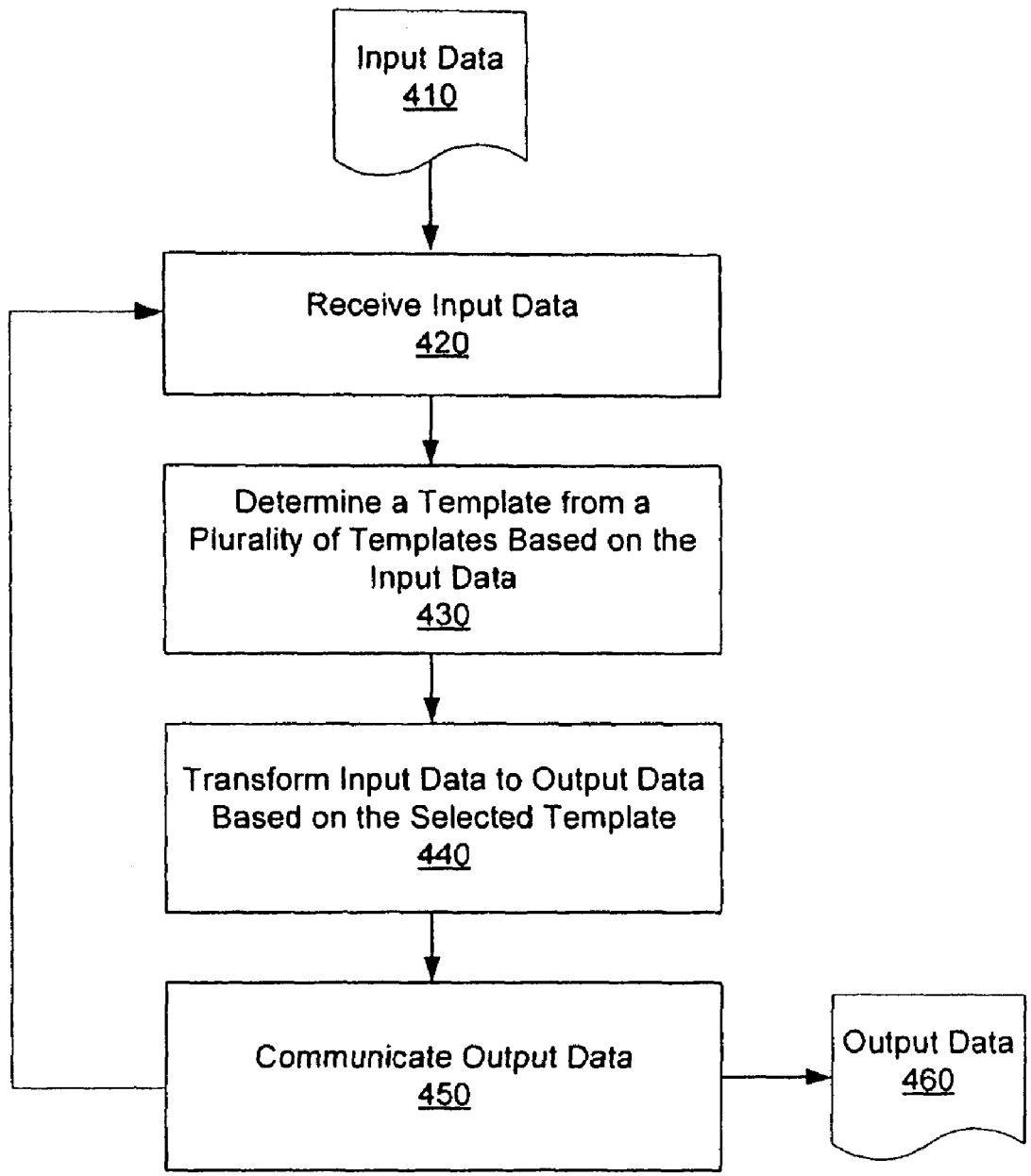
FIG. 4 depicts an exemplary flowchart of the transformation of input data to output data.

FIG. 4 depicts an exemplary flowchart 400 of the transformation of input data to output data utilizing the transformation and exchange system 300 of FIGS. 3A and 3B. The transformation and exchange server 120 receives (420) the input data, in this example, input data C 310c. The transformation and exchange server 320 determines (430) a data template, in this example, the data template F 322*f*, from a plurality of templates 334 based on the input data C 310*c*. The transformation and exchange server 320 transforms (440) the input data C 310*c* to output data 460 based on the selected template F 322*f*. The transformation and exchange server 320 communicates (450) the output data 460 via an output data stream.

Figure 5A:
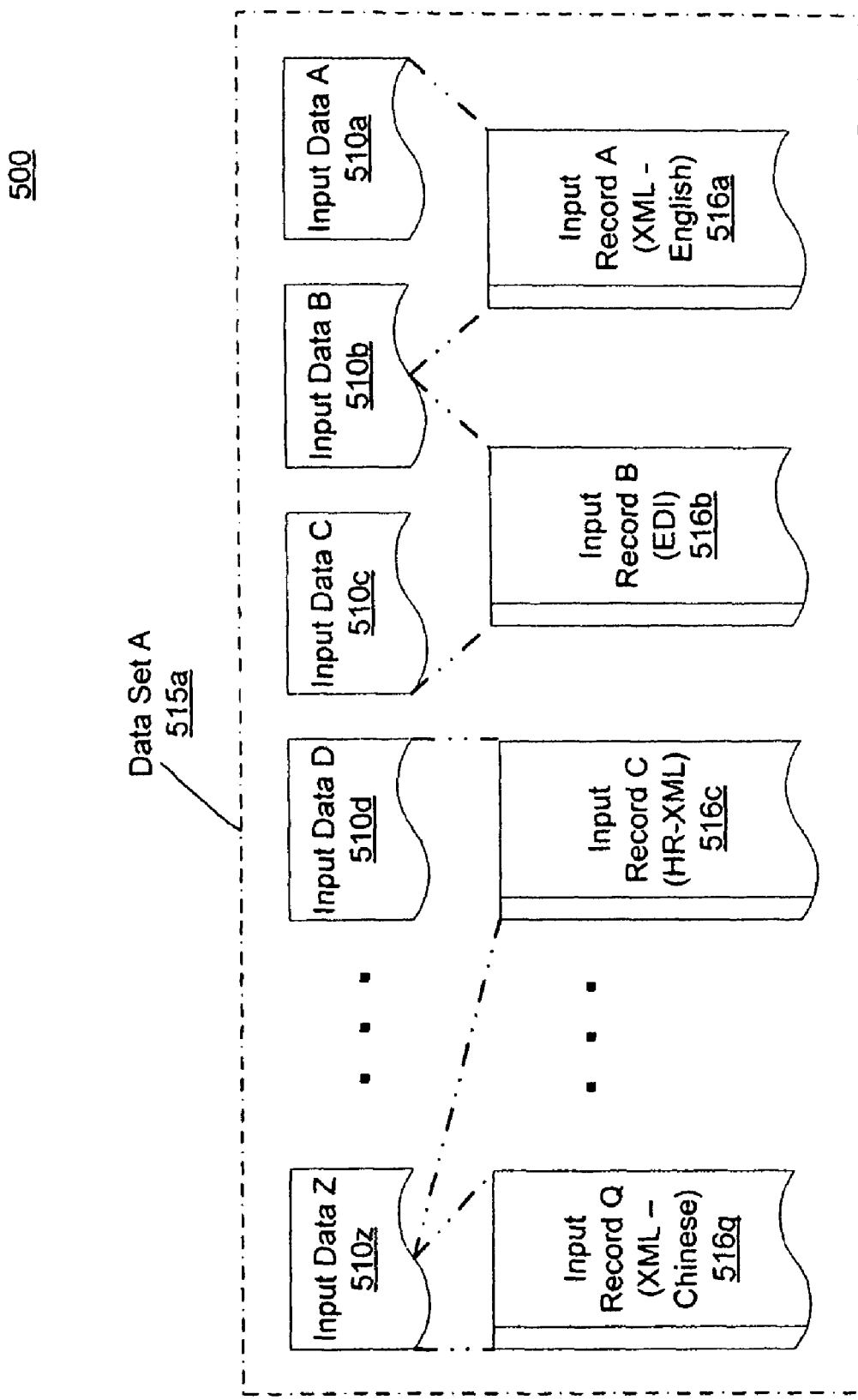
FIGS. 5A and 5B illustrate another exemplary transformation and exchange system transforming data input.
Figure 5B:
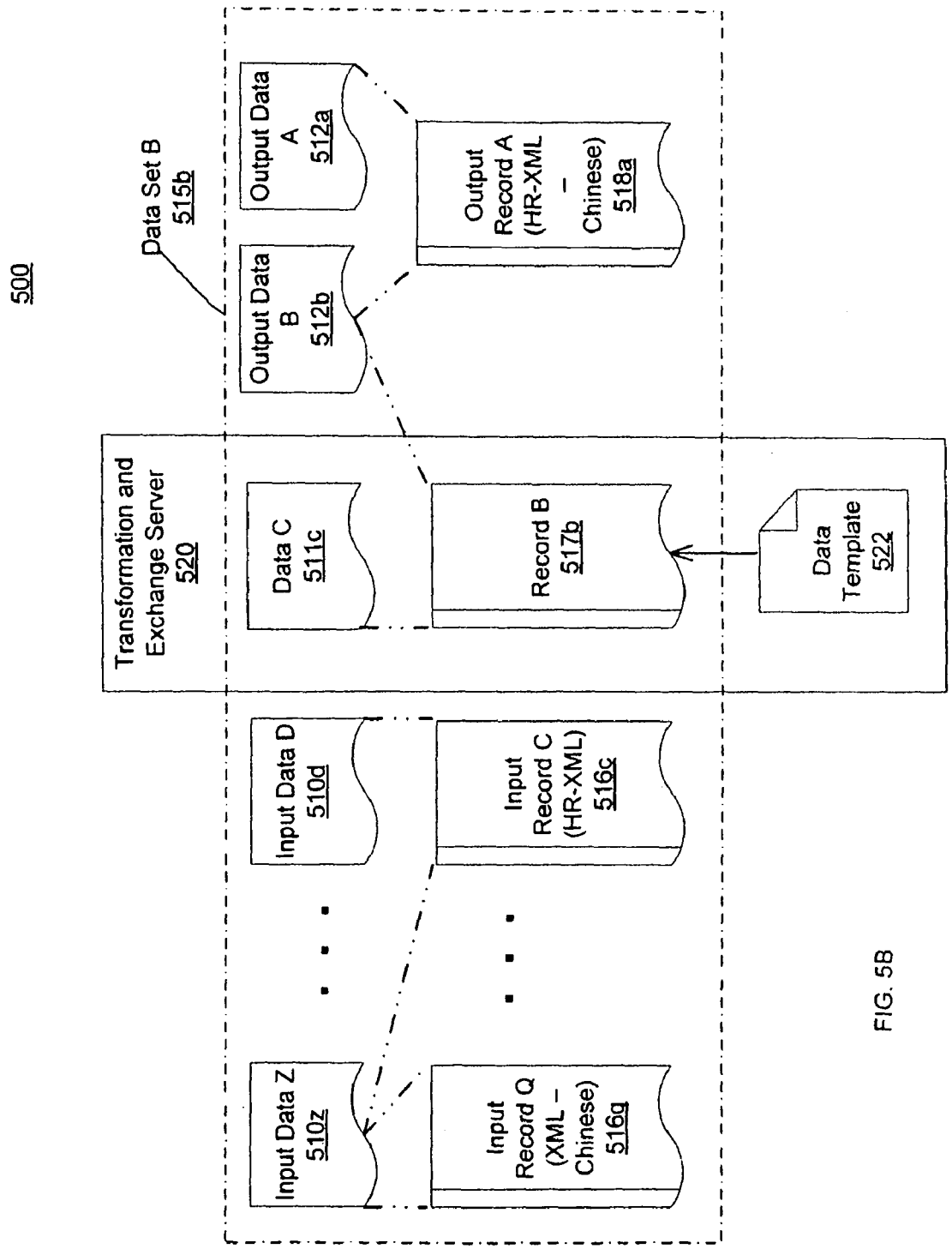

FIGS. 5A and 5B illustrate another exemplary transformation and exchange system 500 transforming data input. FIG. 5A illustrates another exemplary data set A 515*a*. The data set A 515*a* includes a plurality of input data A 510*a*, B 510*b*, C 510*c*, D 510*d* through Z 510*z* (generally 510). The data set A 515*a* includes a plurality of input records A 516*a*, B 516*b*, C 516*c* through Q 516*q* (generally 516). Each input record 516 is associated with one or more of the input data 510. The input data A 510*a* and part of input data B 510*b* includes the input record A 516*a*. As another illustration, the input data D 510*d* through part of the input data Z 510*z* includes the input record C 516*c*. The transformation exchange server 520 determines boundary points of data set A 515*a* based on the input records as illustrated. The boundary points can be determined based on the protocols of the input records 516.

The transformation and exchange system 500 includes a data set B 515*b* and a transformation and exchange server 520. The data set B 515*b* represents the data set A 515*a* after processing part of the input records 516 by the transformation and exchange server 520. As illustrated in FIG. 5B, the transformation and exchange server 520 transforms the input record A 516*a* into the output record A 518*a* (in this example, transforms the record from XML—English to HR-XML—Chinese). The transformation and exchange server 520 transforms the input record A 516A into output record A 518*a* based on a data template, e.g., data template 522. The transformation and exchange server 520 transforms the input data C 510*c* into output data (not shown) via the data C 511*c*.

In some examples, each input data 510 is a data packet in a packet protocol. For example, each input data 510 is a TCP/IP packet and the input records 510 illustrate content that can be split between TCP/IP packets for transmission.

In other examples, the input data can be streamed into the transformation and exchange system 500 without first loading the entire data set 515*b* into a storage module (e.g., a network attached storage device, a storage area network, a redundant array of independent disks, etc.). This is accomplished by selecting the correct template, e.g., 522, and then using that template as a guide for transforming the input data and/or input records. Advantageously, the transformation and exchange server 520 can transform the input records 516 into output records 518 without storing all of the input records 516 in the data set 515*b*. In other words, the transformation and exchange server 520 transforms the input records 516 into output records 518 in or substantially in real-time, which advantageously reduces the storage requirements and storage time associated with storing each data set for transformation.

In some examples, the transformation and exchange server 520 transforms an inbound data protocol to an outbound data protocol directly, without using a canonical form. This is accomplished by breaking up the data stream into records based on proper boundary points. This allows individual records to be sent off on-the-fly in a multi-threaded operation. Since the transformation and exchange server 520 can enable true native-to-native translation of data, the transformation and exchange system 500 is advantageously not encumbered by data size limitations or throughput issues related to the overhead of managing state data associated with a canonical form, etc. Another advantage of the direct transformation is that the system 500 is truly scalable and exhibits extraordinary throughput.

Although FIGS. 5A and 5B illustrate the input data 510 being received in sequence, the transformation and exchange system 520 can transform the input records 516 out-of-sequence if the input data 510 is received out-of-sequence. For example, the transformation and exchange server 550 receives the input data C 510*c* before the input data B 510*b*. The transformation and exchange server 550 can determine a start boundary point of the input record B 516*b* based information associated with the input data A 510*a* and C 510*c* (e.g., packet numbers, time stamps, etc.), a change in the protocol of the input record A 516 and B 516*b* (e.g., XML to EDI, a format change, a content change, etc.), and/or any other types of information associated with a record change (e.g., modified recipient information, modified authentication information, etc.). In other words, the transformation and exchange server 550 determines the start boundary point for a new input record even though the end boundary point for the input record A 516*a* has not been reached.

Figure 6:
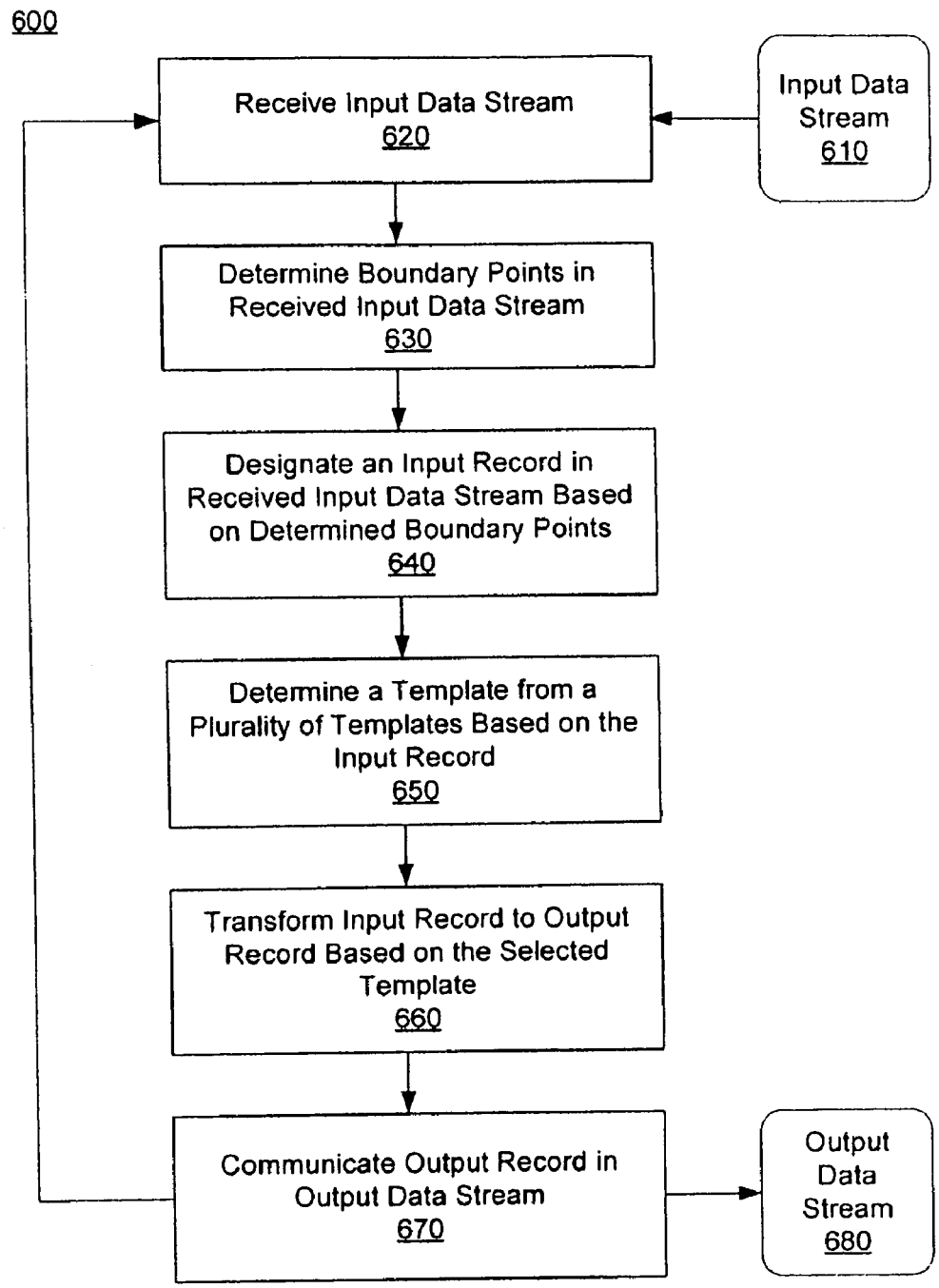
FIG. 6 depicts an exemplary flowchart of the transformation of input records to output records.

FIG. 6 depicts an exemplary flowchart 600 of the transformation of input records to output records via the transformation exchange server 520 of FIG. 5B. The transformation and exchange server 520 receives (620) an input data stream 610. The input data stream 610 includes all or part of the data set A 515*a*. The transformation and exchange server 520 determines (630) the boundary points in the received input data stream 610 as illustrated by the input records 516. The transformation and exchange server 520 designates (640) an input record, e.g., A 516*a*, in the received input data stream based on determined boundary points. The transformation and exchange server 520 determines (650) a template 522 from a plurality of templates 334 of FIG. 3A based on the input record. The transformation and exchange server 520 transforms (660) the input record A 516*a* to an output record A 518*a* based on the template 522. The transformation and exchange server 520 communicates (670) the output record in an output data stream 680. The output data stream 680 includes all or part of the data set B 515*b*.

For example, the transformation and exchange server 520 of FIG. 5B receives (620) an input data stream 610 which includes the data set A 515*a* of FIG. 5A. The transformation and exchange server 520 determines (630) the boundary point in the received input data stream. In this example, the determined boundary points are based on the record B 517*b* location. In other words, the boundary points for record B are points in the input data B 510*b* and the input data C 510*c*. The transformation and exchange server 550 designates (640) the input record B 516*b* in the received input data stream based on the determined boundary point of the record B 516*b*. The input record B 516*b* is split between the input data B 510*b* and the input data C 510*c*. The transformation and exchange server 520 determines (650) a template from the plurality of templates based on the input record. In this example, the transformation and exchange server 550 determines (650) the data template 522 for record B 517*b*. The transformation and exchange server 520 transforms (660) the input record B 516*b* in EDI protocol into the output record in XML protocol for Retailer ABC, Inc. (not shown). The transformation exchange server 520 communicates (670) the output record A 518A via the output data stream 680.

In some examples, the boundary point is associated with the beginning and/or end of a protocol. In other examples, the boundary points are determined (630) based on content in the input record 516 and/or input data 510. For example, the boundary point for input record C 516*c* is determined (630)

by examining the HR-XML fields in comparison to the known start and end boundary point for XML. In this example, the input record C 516*c* starts with <?XML version="1.0" English> which indicates the beginning boundary for the input record C 516*c*. The ending boundary for the input record C 516*c* is determined (630) based on the well-formed XML elements that indicate the end of the document (e.g., <Step> . . . </Step> and/or the beginning boundary for the input record Q 516*q*, e.g., <?XML version="1.0" Chinese>.

As another example, the boundary point for input record Z (not shown) is determined (630) by examining the HTML fields in comparison to the known start and end boundary points for HTML. In this example, the input record Z starts with <HTML> which indicates the beginning boundary for the input record Z. The ending boundary for the input record Z is determined (630) based on the well-formed HTML elements that indicated the end of the document. In this example, the input record Z ends with </HTML> which indicates the ending boundary for the input record Z.

Figure 7:
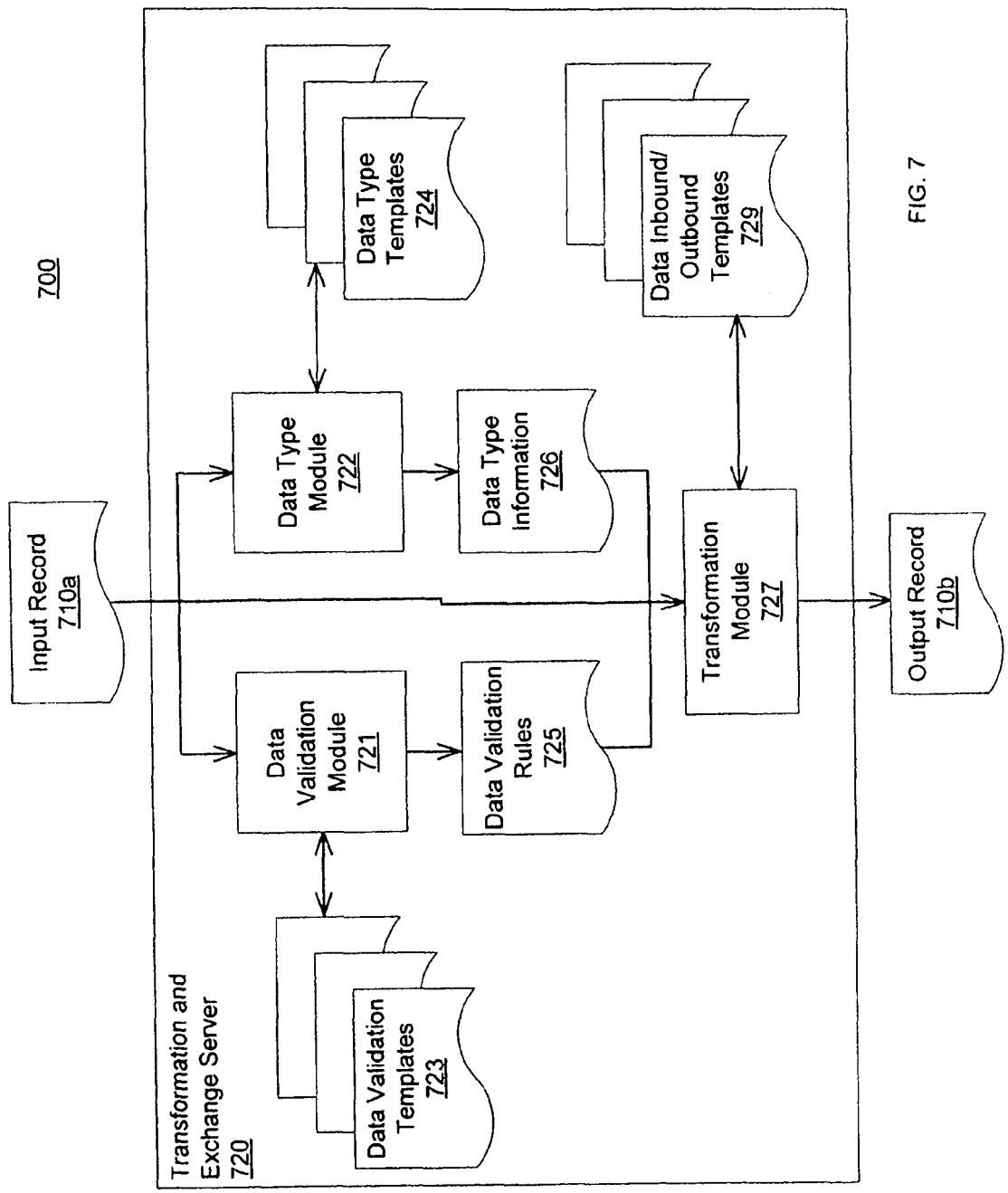
FIG. 7 illustrates another exemplary transformation and exchange system with a data validation module and a data type module.

FIG. 7 illustrates another exemplary transformation and exchange system 700 with a data validation module 721 and a data type module 722. The transformation and exchange system 700 receives an input record 710*a*, whereby the transformation and exchange system 700 includes a transformation and exchange server 720 which outputs an output record 710*b*. The transformation and exchange server 720 includes the data validation module 721, the data type module 722, data validation templates 723, data type templates 724, data validation rules 725, data type information 726, a transformation module 727, and data inbound/outbound templates 729. The data validation module 721 provides data validation rules to the input record 710*a*, and the data type module 722 categorizes the input record 710*a* into data types.

Figure 8:
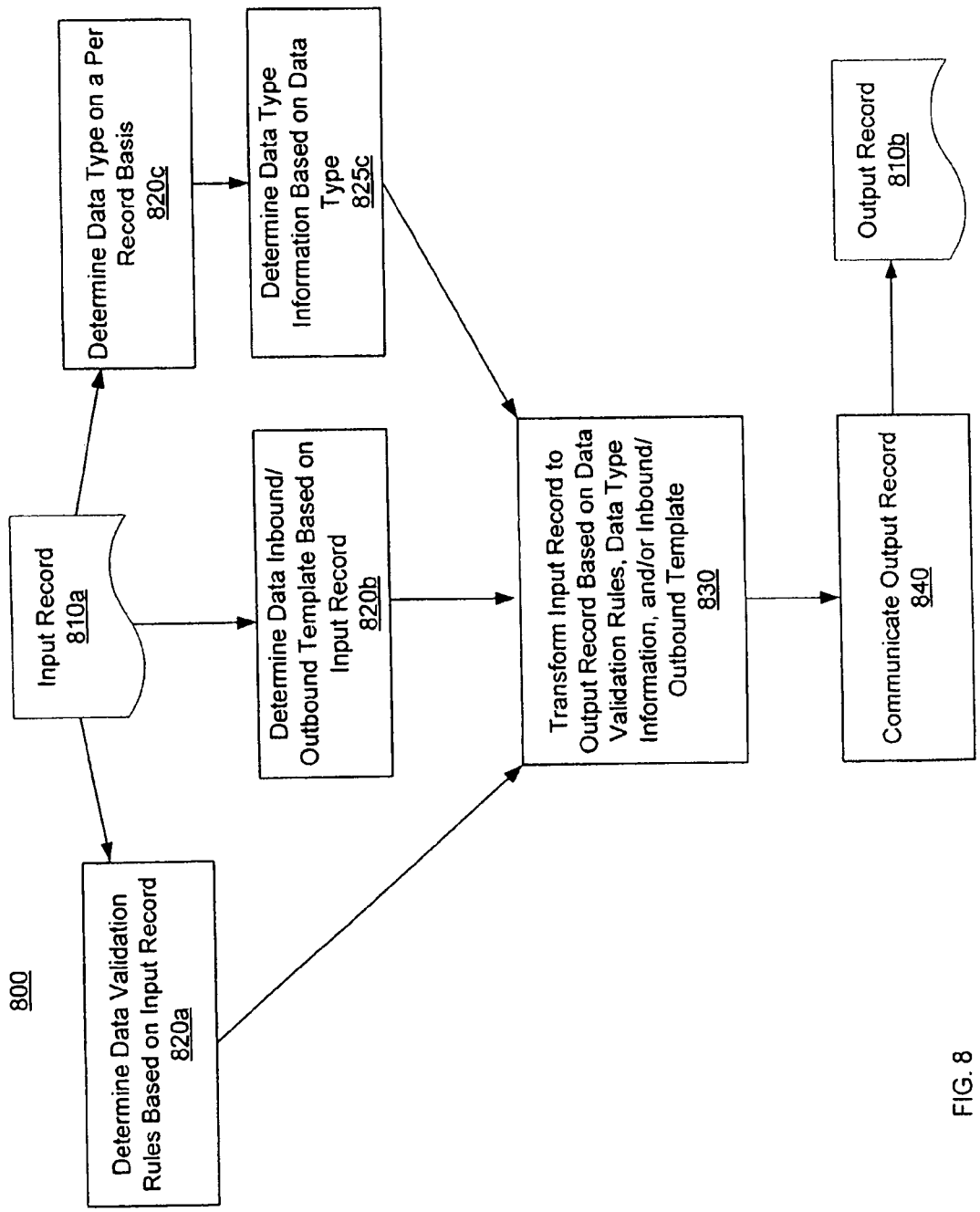
FIG. 8 depicts a flowchart of transforming input records into output records.

FIG. 8 depicts a flowchart 800 of transforming input records into output records via the transformation and exchange system 700 of FIG. 7. The transformation and exchange server 720 receives the input record 810*a* in an input data stream (e.g., an asynchronous transfer mode data stream, a series of associated IP packets, etc.). The data validation module 721 determines (820*a*) the data validation rules 725 based on the data validation templates 723 and the input record 810*a*. The transformation module 727 determines (820*b*) an inbound/outbound template from a plurality of inbound/outbound templates 729. The data type module 722 determines (820*c*) a data type (e.g., text, number, currency, date, etc.) of the input record 810*a* based on the data type templates 724. The data type module 722 determines (825*c*) data type information based on the data type of the input record 810*a*.

The transformation module 727 transforms (830) the input record 810*a* into an output record 810*b* based on the data validation rules, the data type information, and/or the inbound/outbound template. The transformation module 727 communications (840) the output record 810*b* via an output data stream. The separation of the data validation from the data typing advantageously reduces the maintenance of templates (e.g., data validation templates, data type templates, data inbound/outbound templates, etc.) since the change of information in a template for validation and/or type can be made universally.

For example, a data validation rule for times is modified in the data validation templates for all banks to use Eastern Standard Time for all transactions based on a ruling by a federal agency. A data validation rule can be formulated for each bank based on the data validation template for the bank data to transform any other times into Eastern Standard Time (EST). The ability to change data validation rules broadly enables universal changes for groups and/or delineations without having to modify the data inbound/outbound templates 729 for each entity. As another example, a data type is modified to identify dates with time zones as a type of date with a time offset from the coordinated universal time (UTC). This universal change advantageously reduces the maintenance of the other templates, since the change can be made universally for all of the specified data types.

In some examples, the template (e.g., data validation template, data type template, data inbound/outbound template, etc.) is determined for the inbound data on a per record basis by interrogating the data. Thus, entities can mix data protocols (e.g., formats, standards, etc.) in a data stream. Since this mixing could require multiple templates across the data stream, the transformation and exchange server 720 looks into the inbound data and determines which template to use and while processing it will change to a different template when the data type or data structure changes. For example, the first three records of input data (not shown) are determined to require a first template, and the next four records of input data (not shown) are determined to require a second template different from the first template.

In other examples, the determination of data validation rules 725 by the data validation module 721 occurs independently from the determination of the data type and data type information by the data type module 722. An advantage of the independent determinations is that the data types can have different templates from the data validation, which decreases the transformation time of records by the transformation module 727 and allows for reusability and scalability of the validation external from the data type.

Figure 9:
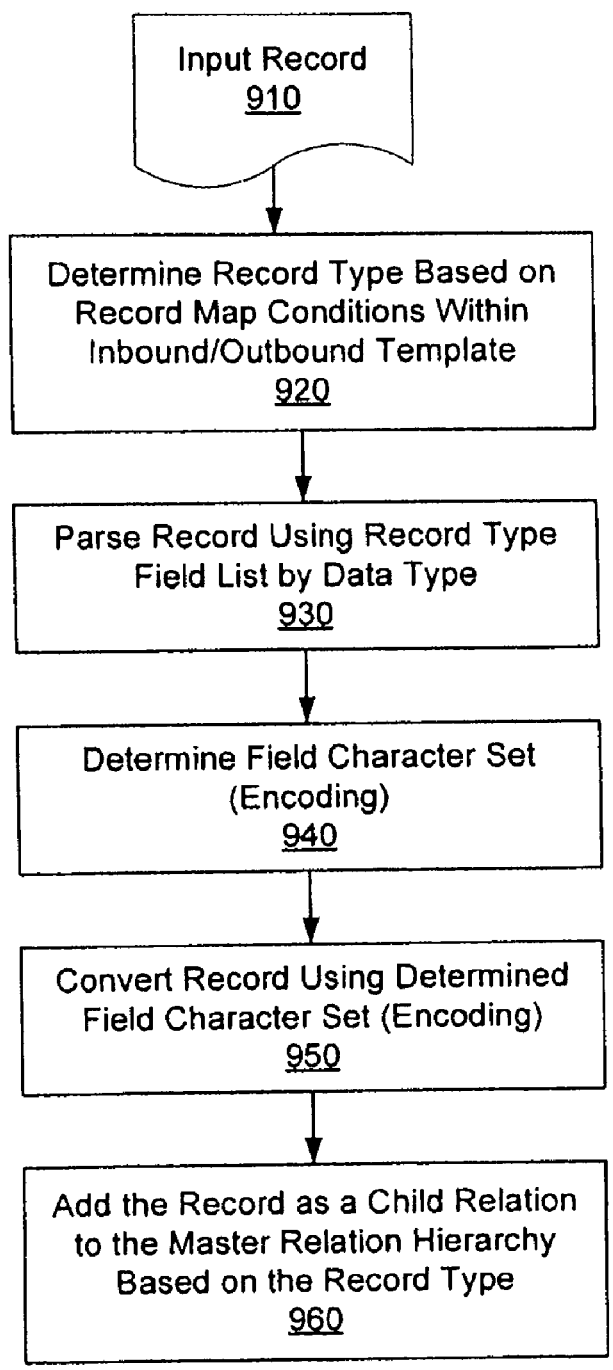
FIG. 9 depicts a flowchart of converting data for field character sets.

FIG. 9 depicts a flowchart 900 of converting data for field character sets via the transformation and exchange system 700 of FIG. 7. The transformation module 727 determines (920) a record type of an input record 910 based on record map conditions within an inbound/outbound template. The transformation module 727 parses (930) the input record 910 using record type filed list by the data type. The transformation module 727 determines (940) the field character set (encoding) based on the parsed information and converts (950) the record using the determined field character set (encoding) into the output field character set (e.g., English to Japanese, French to English, etc.). The transformation module 727 adds (960) the converted record as a child relation to the mater relation hierarchy based on the record type.

In some examples, multiple character encoding schemes are utilized within a single record. As such, the transformation and exchange system 700 can use/accommodate multiple character encoding schemes within a template. The transformation and exchange system 700 can use multiple character encoding schemes within a record by selecting during translation from among a plurality of character encoding schemes (e.g., English, Spanish, Chinese, Japanese) for inbound/outbound data based on an interrogation of the respective data.

In other examples, the multiple character encoding schemes are implemented by enhancing the existing Record/Field parsing logic to determine the field level character decoding to use. Thus, the system 700 can support any language (English, Spanish, Japanese, etc) in one or more records. Advantageously, the character encoding schemes can be modified in a record after an initial character encoding scheme is determined for the record which decreases the overhead associated with sending a separate record for each character encoding. In some examples, a determination is made for each of a plurality of fields within a record of a character encoding scheme for decoding data associated with that field.

In some examples, the record type of an input record 910 includes any type of data type (e.g., text, number, etc.) and/or database type (e.g., default mappings, row information, etc.). The record type can be determined (920) based on record map conditions such as type-to-type conversion, record-to-record conversion, content-to-content conversion and/or other types of conditions. For example, the record map conditions include a mapping between different database servers which handle numbers different. Due to the number handling differences, the record type is determined (920) based on the record map conditions (e.g., output data type is an integer while input data type is a floating point, etc.).

Figure 10:
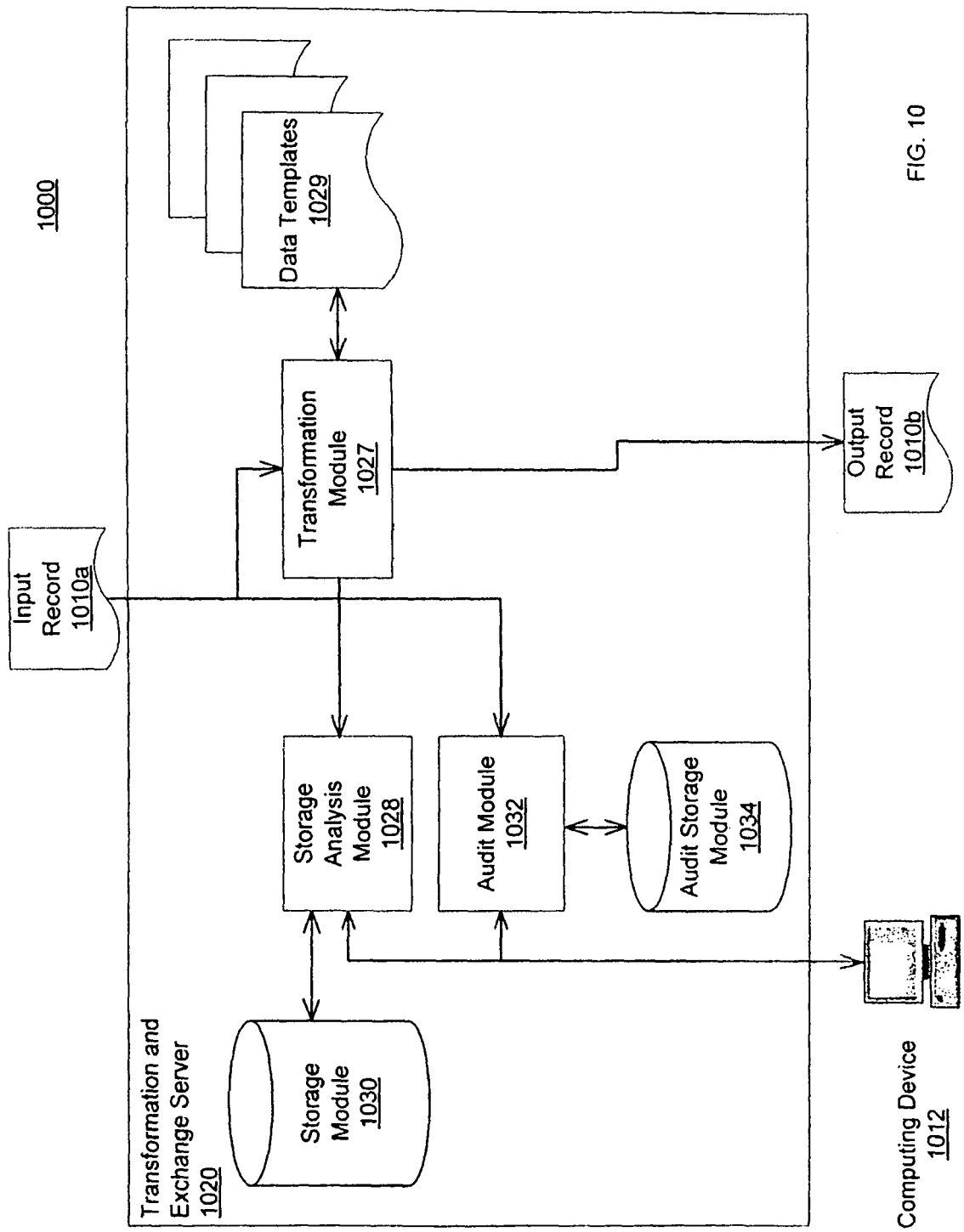
FIG. 10 illustrates another exemplary transformation and exchange system with a storage analysis module.

FIG. 10 illustrates another exemplary transformation and exchange system 1000 which includes a storage analysis module 1028. The transformation and exchange system 1000 receives an input record 1010*a*, whereby the system 1000 includes a transformation and exchange server 1020 and a computing device 1012, and whereby the system 1000 outputs an output record 1010*b*. The transformation and exchange server 1020 includes a transformation module 1027, a storage analysis module 1028, a plurality of data templates 1029, a storage module 1030, an audit module 1032, and an audit storage module 1034.

Figure 11:
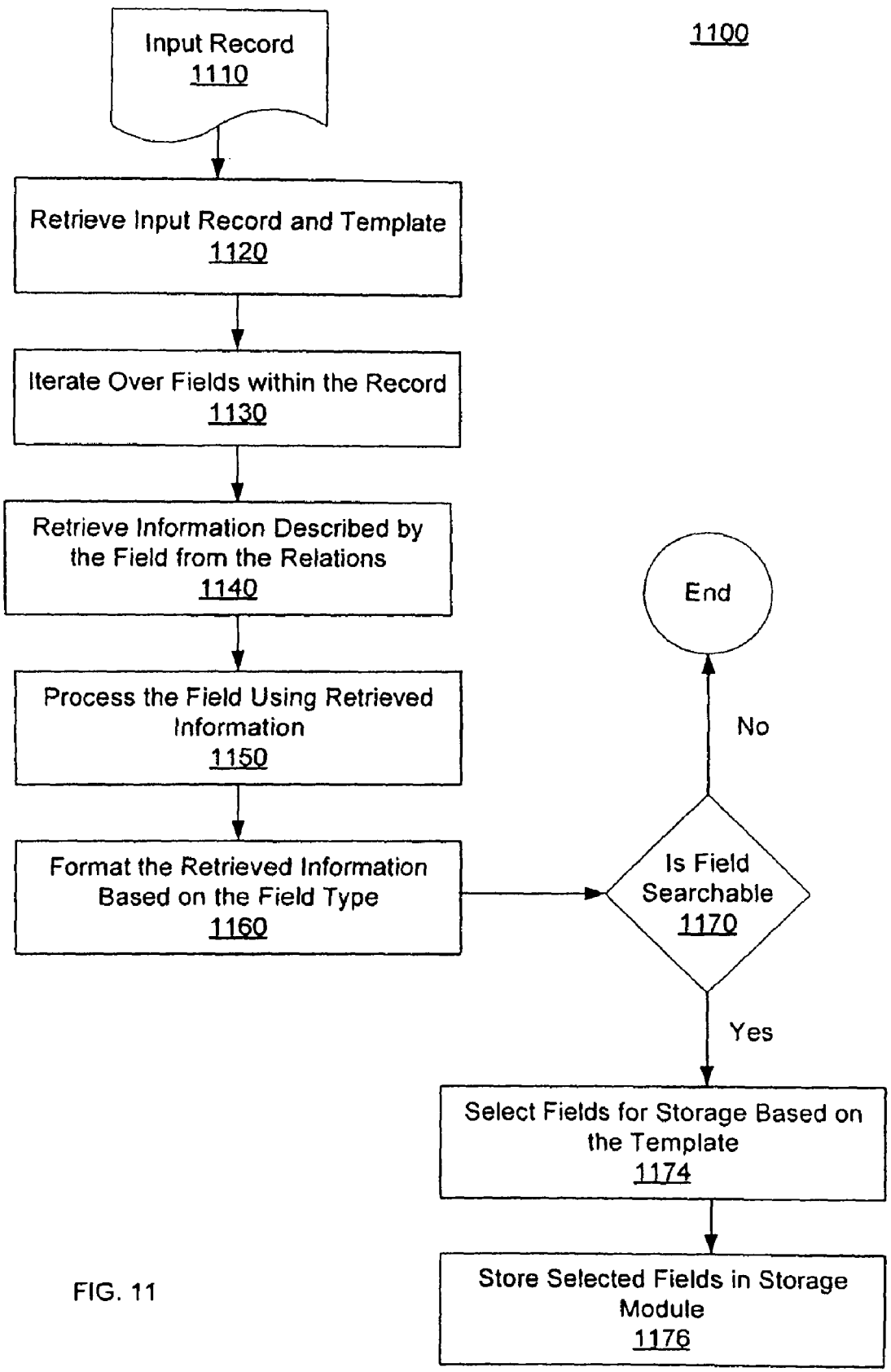
FIG. 11 depicts an exemplary flowchart for searching and storing data.

FIG. 11 depicts an exemplary flowchart 1100 for searching and storing data via the transformation and exchange system 1000 of FIG. 10. The storage analysis module 1038 retrieves (1120) the input record 1010*a* and the template. The template is determined by the transformation module 1027 from the plurality of data templates 1029 based on the input data 1010*a*. The storage analysis module 1028 iterates (1130) over fields within the record and retrieves (1140) information described by the field based on the relations (e.g., associated information types, connection between current age and date of birth in record, etc.) described in the template.

The storage analysis module 1028 processes (1150) the field using the retrieved information and formats (1160) the retrieved information based on the field type. The storage analysis module 1028 determines (1170) whether the field is searchable. If the field is not searchable, the processing ends. If the field is searchable, then the storage analysis module 1028, selects (1174) fields for storage based on the template. The storage module 1030 stores (1176) the selected fields.

A user utilizing the computing device 1012 can access the storage analysis module 1028 to search and/or execute queries on the stored information in the storage module 1030. The storage analysis module 1028 can utilize a GUI via a stand-alone application and/or a website for access (e.g., search, queries, management, etc.) to the information stored by the storage module 1030.

Although FIG. 11 is described as retrieving (1120) and processing the input record 1010*a*, the storage analysis module 1028 can also retrieve and process the output record 1010*b*. In other words, the input record 1010*a* and/or the output record 1010*b* can be processed by the storage analysis module 1028.

In some examples, the searchable data can be created against a transaction, without using customized code, by designating specific data fields for the storage module (e.g., ord-num, date, price, etc.). For example, already-processed data and/or records can be input into the storage module 1030 by re-processing that data and/or records. Another advantage to the selection of specific data fields being performed during translation of the data is that all of the power of a data warehouse as well as having real-time access to the same data makes the data storage valuable to end users like Finance and IT operations. Still further, there is no programming needed; since all that is needed is to just configure, at template creation, each field that needs to be reportable.

In other examples, the storage of searchable data/records in the storage module 1030 can be implemented by marking automatically during translation at least one data field to be searchable. The designation of searchable can occur by the user checking a box in a template to indicate to the system 1000 that that field is to be searchable.

The transformation and exchange system 1000 includes the audit module 1032 and the audit storage module 1034 which create a chain of custody/audit trail data. The chain of custody/audit trail data can include everyone/everything that has edited the data/records by connecting to the system 1000. In other words, the audit module 1032 generates an accessible log of actions for the input record and/or the output record. The audit module 1032 enables the searching for transactions by date, time, elapsed time, error transactions, data depot reportable fields, and/or any other fields or data types. The audit module 1032 can also retrieve from a scheduler module (not shown) what is scheduled to run in the future. This audit ability advantageously allows for real-time chain of custody compliance, not compliance based on happened in the past, but what is happening now. Chain of custody of data is a requirement in law enforcement, forensics, health and financial compliance. The system capability advantageously meets or exceeds those requirements.

In some examples, the creation of a chain of custody/audit trail data is by utilized a base class to log every action (e.g., a Get command, a Translation command, a Send Command, a Call Plug-in, etc.) that is applied to the data/records. For example, a sales computing device 112 transmits a Get command for all sales data for FY 2006. The transformation and exchange server 1020 receives the request and transforms the request from an input protocol into an output protocol. The audit module 1032 can log the Get command with information regarding the input record in the input protocol and/or the output record in the output protocol.

A user utilizing the computing device 1012 can access the audit module 1032 to search and/or execute queries on the stored information in the audit storage module 1034. The audit module 1032 can utilize a GUI via a stand-alone application and/or a website for access (e.g., search, queries, management, etc.) to the information stored by the audit storage module 1034 and/or in-process reports of transactions.

Figure 12:
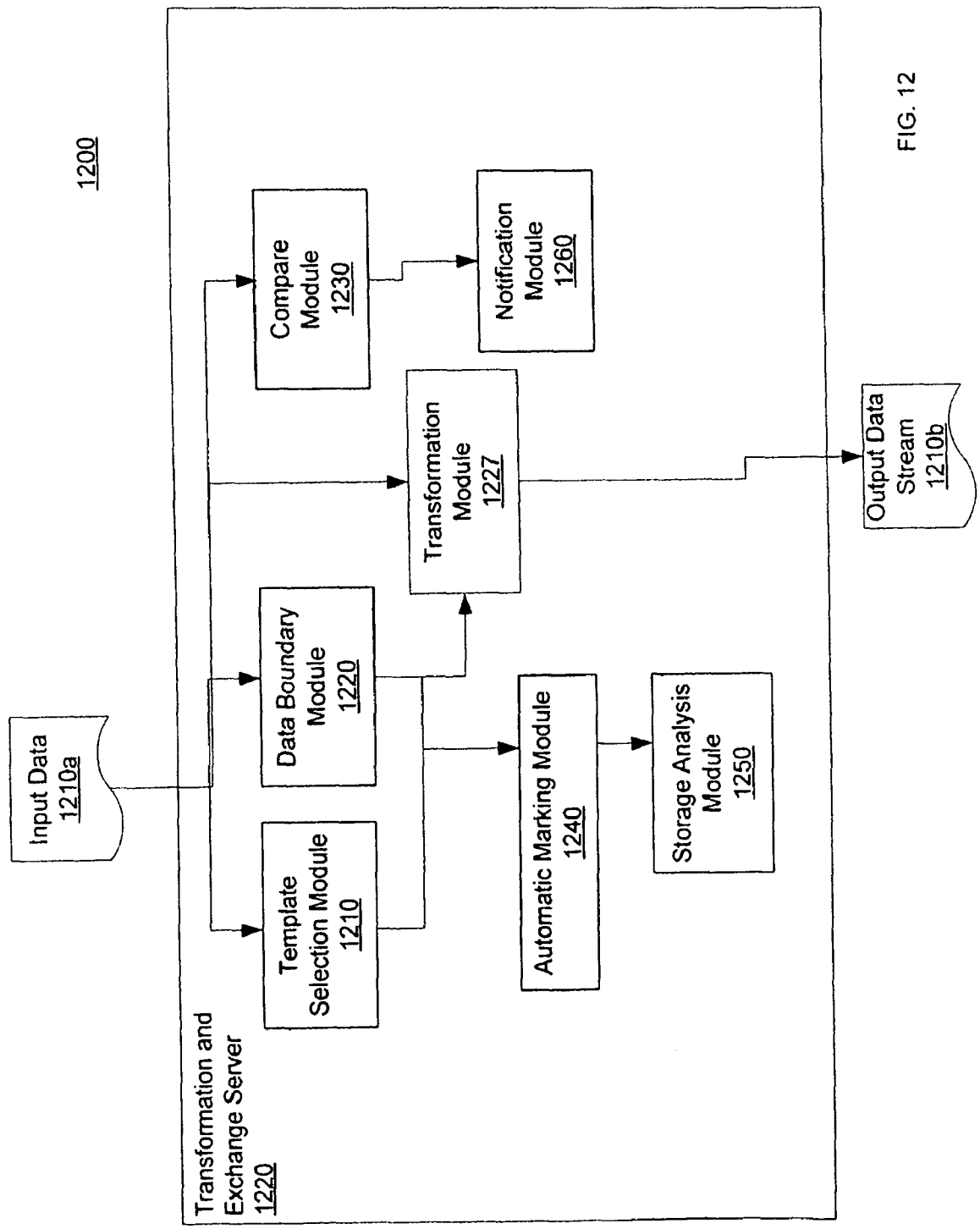
FIG. 12 illustrates another exemplary transformation and exchange system for storage and notification processing.

FIG. 12 illustrates another exemplary transformation and exchange system 1200 for storage and notification processing. The transformation and exchange system 1200 receives an input data stream 1210*a*, whereby a transformation and exchange server 1220 outputs an output data stream 1210*b*. The transformation and exchange server 1220 includes a template selection module 1210, a data boundary module 1220, a compare module 1230, a transformation module 1227, an automatic marking module 1240, a storage analysis module 1250, and a notification module 1260.

The template selection module 1210 selects a template from among a plurality of templates on at least a per record basis to use to translate the input record to the output record and communicates the selected template to the automatic marking module 1240 and the transformation module 1227. The data boundary module 1220 determines the data boundary for the input data 1210*a* and can break up the input data into individual records (e.g., the breaking up is based on boundary points) and communicates the individual records to the automatic marking module 1240 and the transformation module 1227. The automatic marking module 1240 automatically marks at least one data field to be searchable by use of the selected template. The storage analysis module 1250 stores data from the at least one data field in one or more records into a storage module (not shown) in a searchable format. The transformation module 1227 transforms the input record into an output record based on the selected template and communicates the output record via the output data stream 1210*b*.

The compare module 1230 selects input data above one or more threshold values and generates a communication (e.g., a visual message, a text message, an email, an automated voice message, etc.) if the threshold value is met or exceeded. The notification module 1260 sends the communication (e.g., textual display, graphical display, email server, etc.). In some examples, the compare module 1230 aggregates data from a plurality of input data and/or records to determine if a threshold value is met or exceeded. For example, a threshold value is for all sales over $30,000, the sales manager receives an email with the details of the transaction.

Figure 13:
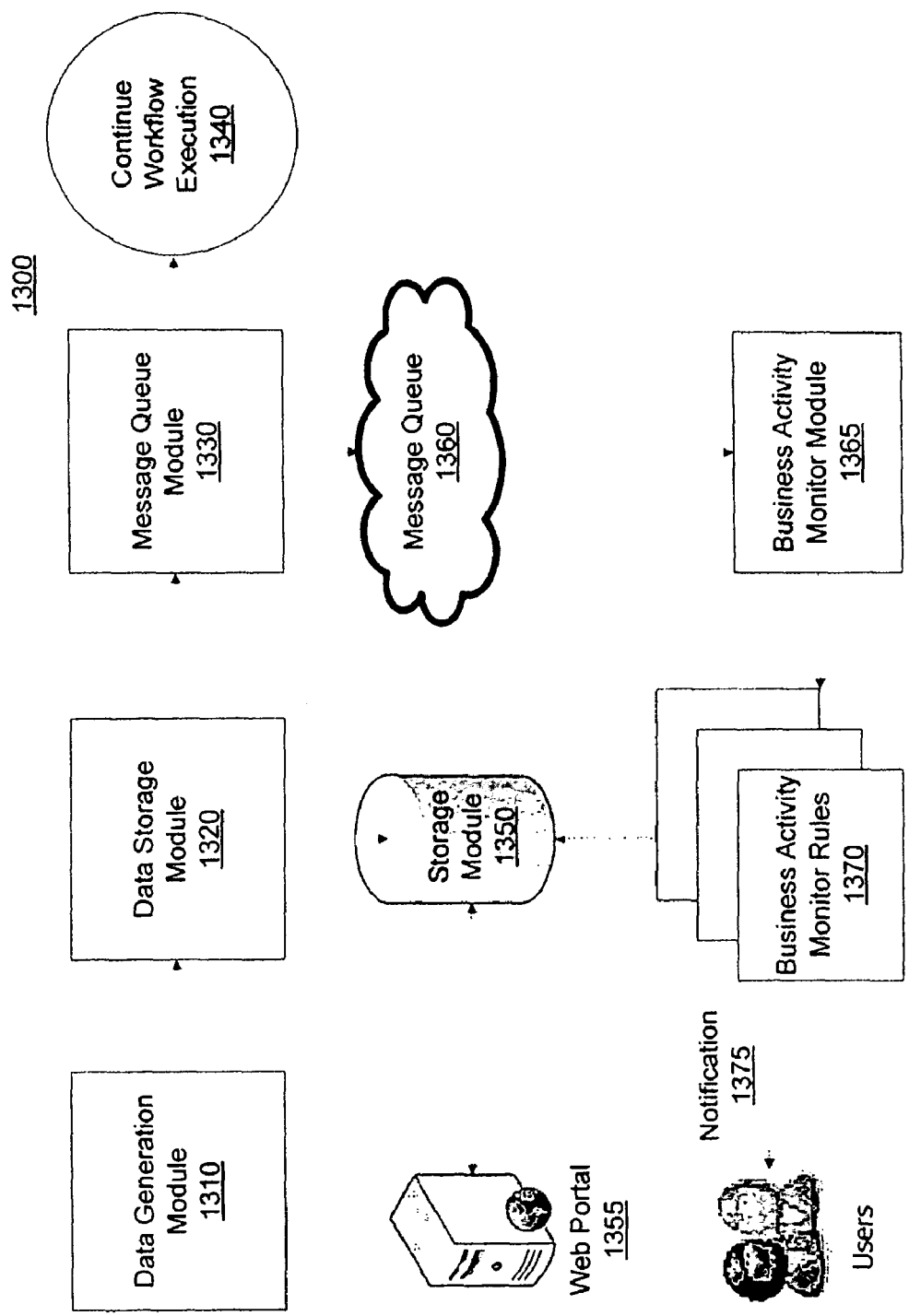
FIG. 13 illustrates another exemplary transformation and exchange system for business activity processing.

FIG. 13 illustrates another exemplary transformation and exchange system 1300 for business activity processing. The transformation and exchange system 1300 includes a data generation module 1310, a data storage module 1320, a message queue module 1330, a storage module 1350, a web portal 1355, a message queue 1360, a business activity monitor module 1365, business activity monitor rules 1370, and a notification 1375 to one or more users. The transformation and exchange system 1300 provides a business activity monitor (BAM). The BAM module 1365 provides analysis and alerting capabilities for an input record and/or an output record.

The data generation module 1310 receives data such as system statistics data, transaction data flowing through the translator, and/or historical data. The data storage module 1320 stores this data in the storage module 1350. The message queue module 1330 sends a message to the message queue 1360 and the workflow execution continues 1340 as described herewithin. The message queue 1360 sends the message to the business activity monitor module 1365, which accesses the business activity monitor rules 1370. The appropriate business rules 1370 are accessed based on the data in the message and an action is taken (e.g., notification 1375 to one or more users).

The web portal 1355 can access the data in the storage module 1350. The web portal 1355 can, for example, provide raw data access and/or determine statistics based on the data stored in the storage module 1350. Although not illustrated in FIG. 13, the web portal 1355 can also be utilized for access to the business activity monitor rules 1370 (e.g., modify, add, delete, etc.).

In some examples, one or more operations can be performed on the data, such as aggregating selected data across a plurality of similar transactions or performing some other appropriate operation of the data. The business activity module 1365 compares the data, or an aggregation of the data, or the result of some other mathematical operation on the data to one or more predetermined threshold(s) or other comparison points for the data. If the threshold is equaled or exceeded or if the value drops to below the threshold, or if another comparison status or statistic is to be communicated, then the business activity monitor module 1365 causes a communication to be generated and sent on one or more distributed computing devices (not shown).

In some examples, the system 1300 checks for values exceeding specified threshold values. When threshold values are exceeded, the system will either send a notification email to a specified address and/or it will execute a workflow for more advanced capabilities. The threshold section will contain in addition to the threshold values a parameter of how often to notify if the threshold is constantly exceeded. For example, the system could be programmed so that if the memory usages exceeds one Gigabyte, notify every hour until the memory usage is below one Gigabyte. A threshold section can contain a second (optional) notification when the value returns below the threshold value informing the user the system is operating again within normal parameters.

In other examples, the threshold values are stored in a database table (not shown). The table contain fields or concatenation of fields, or other aspects of the record to be monitored and include a data table, data column, threshold value, requesting user, interval value (for repeated notifications), a (non-null) email address or workflow name for threshold notification, and a second optional email address or workflow name for notification when values return to a level below the threshold. The threshold value are stored as a string, and will be translated to the native data type at startup time. If the notification string is an email address or list of addresses, a predetermined email message will be sent to the address (or addresses) listed. If the notification string contains a workflow name, that workflow will be executed by the system, provided the requesting user has access to that workflow on the server.

In some examples, default threshold values are determined during the testing and tuning process to ensure that they are useful metrics of problems in the system and method according to the present invention. The default threshold values can, for example, be pre-determined values based on the data type and/or validation rules. For example, a system wide default threshold of $10,000 is set for all money transfers with an e-mail notification to the company manager.

In other examples, the business activity monitor analysis and alerting is executed using stateless session beans in a web framework, and is coordinated by a business activity monitor (BAM) controller (now shown). The BAM controller can execute in a separate thread, and can monitor the message queue 1360 for new data written to the system 1300. On triggering, the BAM controller can use a load balancing scheme to find the least taxed application server (e.g., lowest memory usage, lowest processing usage, lowest average usage for the past sixty minutes, etc.) in a plurality of servers and will send the analysis request to a BAM bean on that server.

In some examples, the business activity monitoring by the business activity monitor module 1365 includes setting up intermediate thresholds, recognizing data as representing a particular monitored business activity (i.e., data field) as it is being translated from an input record to an output record, performing arithmetic operations on the data (e.g., summing, average, etc.), and reporting to a client if an intermediate threshold is breached.

In other examples, the data is only as good as it is relevant, and business people as well as systems operators want and demand a 'what's happening now' view. The business activity monitor module 1365 provides a user interface which enables users to drill down to the transaction level and to the point(s) of interest, whether that be a communication error, or a field value that requires review (e.g., Invoice tax amount over 10K requiring a tax manager to examine and approve.).

In some examples, the web portal 1355 includes a Dashboard GUI coupled with a translator to designate selected parameters to be recognized as business transaction data as the data is being translated to allow aggregation or other mathematical operation of the selected parameters across multiple transactions and represent the aggregated data in selected graphics, e.g., bar charts, pie charts, etc.

Figure 14A:
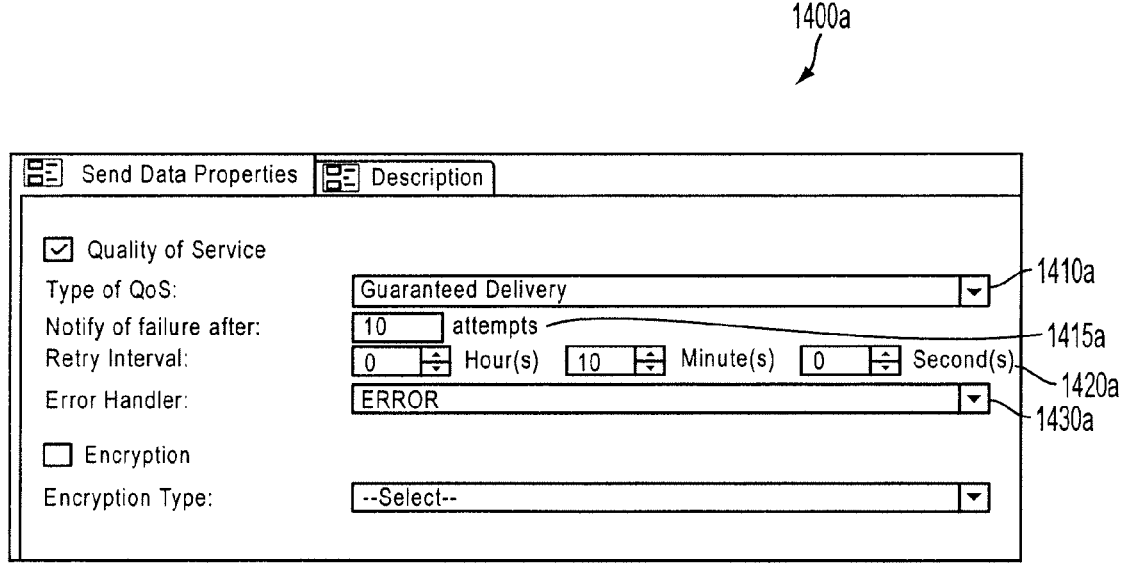
FIGS. 14A and 14B depict exemplary screenshots and of quality of service (QoS) provisions.
Figure 14B:
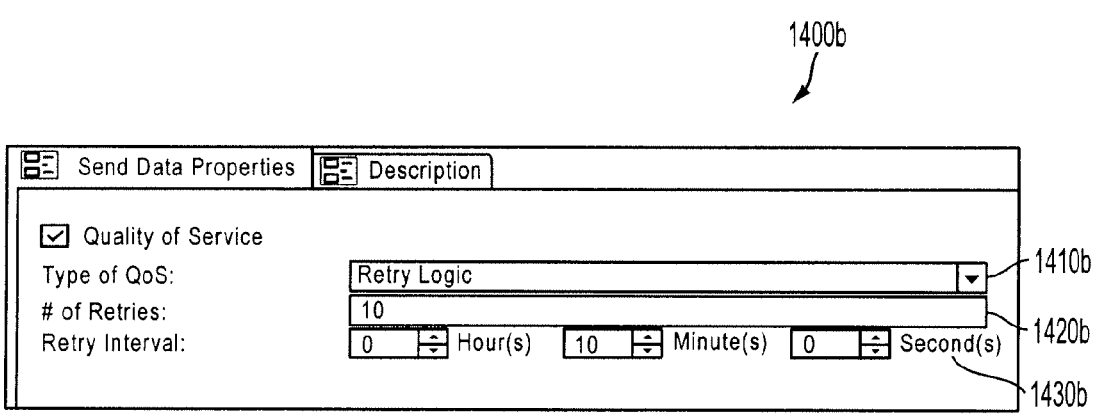

FIGS. 14A and 14B depict exemplary screenshots 1400a and 1400b of quality of service (QoS) provisions for a transformation and exchange system 100 of FIG. 1. The screenshot 1400a illustrates a type of QoS field 1410a (in this illustration, Guaranteed Delivery), the notification field 1415a (in this illustration, ten attempts), the retry interval field 1420a (in this illustration, ten minutes), and the error handler field 1430a (in this illustration, ERROR). The screenshot 1400a illustrates the configuration for a type of quality of service for the transformation and exchange system 100, which is advantageously integrated into the transmission of the output data streams to the computing devices and/or servers.

The screenshot 1400b illustrates a type of QoS field 1410b (in this illustration, Retry Logic), the number of retries field 1420b (in this illustration, ten), and the retry interval field 1430b (in this illustration, ten minutes). Another advantage to the integrated QoS logic is that no custom coding is required, since the QoS provisions can be integrated directly into the templates utilized by the transformation and exchange server 120. For example, many customers use Quality of Service (QoS: Retry and Guaranteed Delivery). By having Retry Logic, it takes merely seconds for customers to setup QoS, whereby conventional systems must have a developer code the adapter and code some type of QoS, which takes a much longer time to implement.

In some examples, the transformation and exchange server 120 receives a communication failure notification associated with the output data stream (e.g., retransmission request, sequence numbers out of order, etc.). The transformation and exchange server 120 can, for example, communicate the output data stream (e.g., future communication, retry communication, etc.) based on quality of service information (e.g., retry every ten minutes, retry five times, etc.) and/or the communication failure notification (e.g., network capacity exceeded, one data packet lost).

Figure 15:
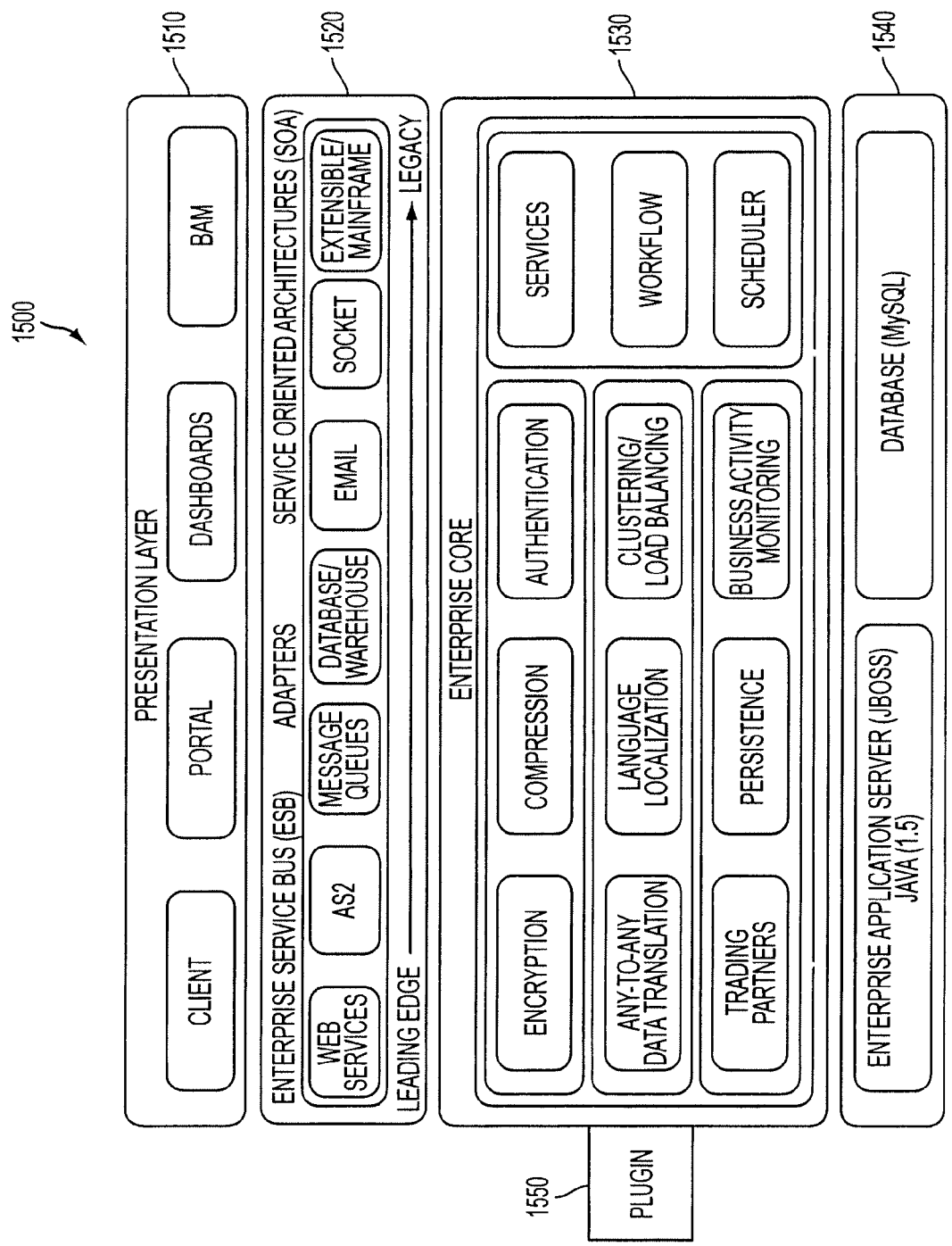
FIG. 15 illustrates an exemplary layered hierarchy for usage in a transformation and exchange system.

FIG. 15 illustrates an exemplary layered hierarchy 1500 for usage in a transformation and exchange system 100 of FIG. 1. The layered hierarchy 1500 enables functionality to quickly and efficiently be modified in the system 100. For example, support for a new protocol (e.g., EDI v.100000, New-XML, etc.) is added by adding an adapter into the hierarchy 1500.

The layered hierarchy 1500 includes a presentation layer 1510, an adapter layer 1520, an enterprise core layer 1530, an application layer 1540, and a plugin layer 1550. The presentation layer 1510 includes a Client, a Portal, Dashboards, and Business Activity Monitor (BAM). The adapter layer 1520 includes the Enterprise Service Bus to Service Oriented Architectures adapters. The adapter layer 1520 includes Web Services, AS2, Message Queues, Database/Warehouse, eMail, Socket, and Extensible/Mainframe.

The enterprise core layer 1530 includes Encryption, Compression, Authentication, Any-to-Any Data Translation, Language Localization, Clustering/Load Balancing, Trading Partner data, rules and procedures, Persistence (file system, database or other storage capability), and Business Activity Monitoring modules. The enterprise core layer 1530 further includes a Services engine, a Workflow engine, and a Scheduler engine. The Services engine, the Workflow engine, and the Scheduler engine provide the hooks/triggers into the various modules.

The application layer 1540 includes servers including a JAVA™ server and a database server. The plugin layer 1550 includes an interface to quickly and efficiently add in supplemental modules and/or workflows into the system 100.

In some examples, predefined data configurations (e.g., references to servers, references to variables, etc.) are pushed across different environments (e.g., test, production, etc.). The predefined data configurations include physical connection information and/or any other type of information that is modified between different environments. For the data configuration push, the workflows from the template are abstracted and a user is allowed to "name" a connection which can then be used in all environments. The connection details can be stored on each server and can be updated for the specific environment (e.g., Development, Quality Assurance, Production, etc.). This setup is particularly advantageous in the development environments since the development setup can be quickly and efficiently transferred to a production setup via a single configuration modification. In some examples, a portal can be used to migrate all of the physical connection information to the Production box when needed.

In other examples, the transformation and exchange system 100 is architected such as to allow transformation of input data to output data in or in substantially real-time. A translator can be called in batch or real-time. The real-time operation can be triggered by many technologies, such as a webservice, a database trigger, a file transfer protocol (FTP) service. In some examples, the system 100 can delivery the output data via real-time processes such as webservices, streaming data, subscribe/publish models, push/pull, and/or batch process mechanism. The system 100 can make a non-real-time service, like FTP, behave as a real-time service, like webservice, by enabling the FTP file to process in real-time versus having to poll for data every few minutes.

The above-described description of the data transformation and exchange describes the transformation of data and the transformation of records. The description for the transformation and/or processing of data can be utilized for the transformation and/or the processing of records. In a similar regard, the description for the transformation and/or processing of records can be utilized for the transformation and/or the processing of data.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or manual operations.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computing device (e.g., computer, etc.) having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The system can include clients and servers. A client and a server are generally remote from each other and typically interact through a communication network. The relationship of client and server arises by virtue of computer programs running on the respective computers and having a client-server relationship to each other.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network).

Examples of communication networks include a packet-based network, a circuit-based network, a local area network (LAN), a wide area network (WAN), the Internet, wired networks, and/or wireless networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for data transformation and exchange, comprising:
receiving an input datastream;
determining an input record based on one or more boundary points in the input data strewn;
determining a template from a plurality of templates based on the input record;
transforming the input record to an output record based on the template;

communicating the output record via an output data stream, the communicating being performed in or substantially in real-time as the input data stream is received;

receiving a communication failure notification associated with the output data stream;

communicating the output data stream based on quality of service information and the communication failure notification, the quality of service information including information as to whether guaranteed delivery is to be performed for the output data stream, and information as to whether retry logic is to be performed for resending the output data stream in the event of a failure in reception occurs;

communicating the output data stream based on dynamically generated information associated with the output data stream, the dynamically generated information including a relative size of the input data stream to the output data stream, wherein the dynamically generated information includes network availability information and processor availability information.

2. The method of claim 1, further comprising designating one or more boundary points in the input data stream based on data type information, a data validation rule, a data inbound template, a data outbound template, or any combination thereof.

3. The method of claim 1, further comprising communicating the output data stream based on a predetermined schedule corresponding to a particular time each day to communicate the output data stream.

4. The method of claim 1, further comprising:
determining one or more data validation rules based on the input record and one or more data validation templates; and
determining data type information based on the input record and one or more data type templates.

5. The method of claim 4, further comprising the transforming the input record to the output record further based on the one or more data validation rules, the data type information, the template, or any combination thereof.

6. The method of claim 4, wherein the one or more data validation rules and the data type information are determined independently.

7. The method of claim 1, further comprising:
iterating through at least one data field in the input record based on the template;
selecting data from the at least one data field in the input record based on the template; and
storing the data in a text searchable format based on the template.

8. The method of claim 1, further comprising:
selecting at least one data field in the input record, the output record, or both based on a business activity monitor rule;
comparing the selected one or more data fields to at least one threshold value; and
transmitting a notification communication based on the comparison of the selected one or more data fields, the notification communication generated based on the comparison.

9. The method of claim 1, further comprising:
generating an accessible log of actions applied to the input record, output record, or both; and
providing an in-process report of the actions applied to the input record, output record, or both.

10. The method of claim 1, further comprising:
aggregating data from selected fields of one or more input records associated with a plurality of transactions to obtain an aggregated value;
comparing the aggregated value to a threshold value; and
transmitting a notification communication based on the comparison of the aggregated value to the threshold value, the notification communication generated based on the comparison.

11. The method of claim 1, further comprising:
aggregating data from selected fields of one or more input records associated with a plurality of transactions to obtain an aggregated value; and
displaying the aggregated value on a computing device.

12. The method as defined in claim 1, further comprising determining for each of a plurality of fields within the input record a first character encoding for decoding data associated with the field.

13. The method as defined in claim 12, further comprising determining a second character encoding for decoding data associated with a second field within the input record.

14. The method of claim 1, wherein the input record utilizes a first protocol and the output record utilizes a second protocol.

15. The method of claim 1, wherein the input record and the output record utilize a same protocol, the input record comprises a first set of data fields, the output record comprises a second set of data fields, and the first set of data fields is different from the second set of data fields.

16. The method of claim 1, wherein the template comprises a plurality of references to a server and further comprising automatically modifying the plurality of references to the server via a single configuration modification.

17. The method of claim 1, further comprising:
providing a user interface to modify one or more templates from the plurality of templates; and
modifying the one or more templates from the plurality of templates based on information received via the user interface and associated with a protocol.

18. A non-transitory computer readable medium storing computer program product for performing data transformation and exchange, the computer program product being executable by a computer and comprising:
first computer program code for receiving an input data stream;
second computer program code for determining an input record based on one or more boundary points in an input data stream;
third computer program code for determining a template from a plurality of templates based on the input record;
fourth computer program code for transforming the input record to an output record based on the template and communicating the output record via an output data stream, the communicating being performed in or substantially in real-time as the input data stream is received;
fifth computer program code for receiving a communication failure notification associated with the output data stream;
sixth computer program code for communicating the output data stream based on quality of service information and the communication failure notification, the quality of service information including information as to whether guaranteed delivery is to be performed for the output data stream, and information as to whether retry logic is to be performed for resending the output data stream in the event of a failure in reception occurs;

seventh computer program code for aggregating data from selected fields of one or more input records associated with a plurality of transactions to obtain an aggregated value and comparing the aggregated value to a threshold value; and eighth computer program code for transmitting a notification communication based on the comparison of the aggregated value to the threshold value, the notification communication generated based on the comparison, wherein the eighth computer program code transmits the notification communication based in part on a parameter corresponding to how often to provide notification if the threshold is constantly exceeded.

19. The non-transitory computer readable medium of claim 18, further comprising:

ninth computer program code for determining one or more data validation rules based on the input record and one or more data validation templates; and tenth computer program code for determining data type information based on the input record and one or more data type templates.

20. The non-transitory computer readable medium of claim 18, further comprising:

ninth computer program code for iterating through at least one data field in the input record based on the template and selecting data from the at least one data field in the input record based on the template; and tenth computer program code for storing the data in a text searchable format based on the template.

21. The non-transitory computer readable medium of claim 18, further comprising:

ninth computer program code for:
selecting at least one data field in the input record, the output record, or both based on a business activity monitor rule;
comparing the selected one or more data fields to at least one threshold value; and
transmitting a notification communication based on the comparison of the selected one or more data fields, the notification communication generated based on the comparison.

22. The non-transitory computer readable medium of claim 18, further comprising:

ninth computer program code for aggregating data from selected fields of one or more input records associated with a plurality of transactions to obtain an aggregated value; and tenth computer program code for displaying the aggregated value on a computing device.

23. The method of claim 1, further comprising transmitting the output data stream as a multicast data stream to a plurality of servers at the same time.

24. The method of claim 10, further comprising:
transmitting the notification communication based in part on a parameter corresponding to how often to provide notification if the threshold is constantly exceeded.

* * * * *